United States Patent
Kato et al.

(10) Patent No.: US 7,926,939 B2
(45) Date of Patent: Apr. 19, 2011

(54) SPECTACLE LENS AND SPECTACLE

(75) Inventors: Yuji Kato, Okazaki (JP); Hidenori Shoji, Okazaki (JP); Tsuyoshi Fukagawa, Okazaki (JP)

(73) Assignee: Tokai Optical Co., Ltd., Okazaki-Shi (JP)

( * ) Notice: Subject to any disclaimer, the term of this patent is extended or adjusted under 35 U.S.C. 154(b) by 216 days.

(21) Appl. No.: 12/141,330

(22) Filed: Jun. 18, 2008

(65) Prior Publication Data
US 2008/0284976 A1 Nov. 20, 2008

Related U.S. Application Data

(63) Continuation of application No. PCT/JP2006/309418, filed on May 10, 2006.

(30) Foreign Application Priority Data

Dec. 28, 2005 (JP) ................................. 2005-377327

(51) Int. Cl.
*G02C 7/10* (2006.01)
(52) U.S. Cl. ....................................................... 351/163
(58) Field of Classification Search .................... 351/44, 351/163, 164, 165
See application file for complete search history.

(56) References Cited

U.S. PATENT DOCUMENTS

| 4,872,749 | A * | 10/1989 | Lummis et al. ................. 351/44 |
| 6,793,339 | B1 | 9/2004 | Yip et al. | |
| 2003/0133124 | A1 * | 7/2003 | Takahashi et al. ............ 356/492 |

FOREIGN PATENT DOCUMENTS

| EP | 1 566 666 A1 | 8/2005 |
| JP | 57-039025 U1 | 3/1982 |
| JP | 59-049502 A1 | 3/1984 |
| JP | 63-175824 A1 | 7/1988 |
| JP | 09-281317 A1 | 10/1997 |
| JP | 11-101901 A1 | 4/1999 |

* cited by examiner

*Primary Examiner* — Scott J Sugarman
(74) *Attorney, Agent, or Firm* — Burr & Brown

(57) ABSTRACT

A spectacle lens is provided with a lens base material and an antireflection film provided on the lens base material (an inner surface and an outer surface seen from a spectacle wearing person). The lens base material is colored with a dye. The antireflection film (antireflection coating layer) is formed by a vapor deposition method such that it slightly reflects incident light in the same color as that presented by the lens base material and transmits all of the remainder. The same color as referred to herein means that the chromaticity coordinate values are equal to each other.

12 Claims, 16 Drawing Sheets

Fig. 1A
Fig. 1B
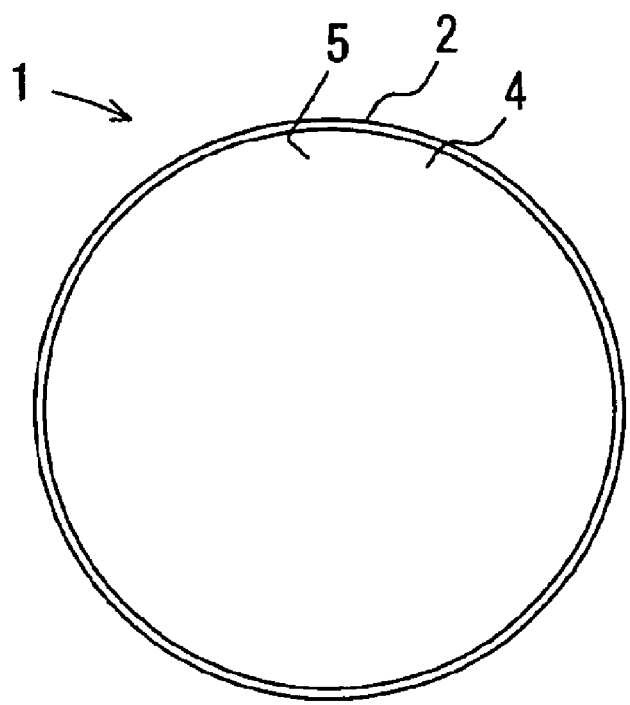
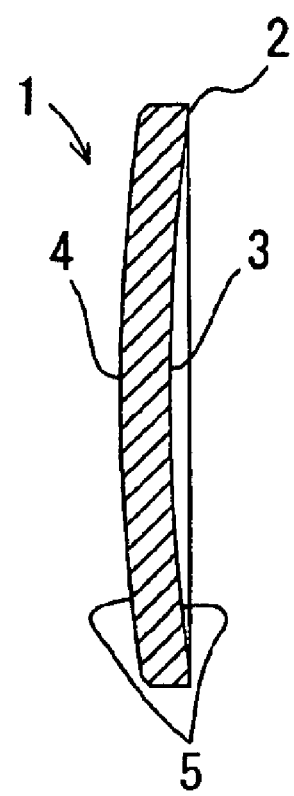

Fig. 2

| Refractive index n | | Optical film thickness nd | | | | | |
|---|---|---|---|---|---|---|---|
| | | Light-Blue | Blue | Purple | Pink | Mars-Yellow | Yellow | Green |
| n1 | 1.46 | 0.222 | 0.050 | 0.065 | 0.123 | 0.082 | 0.063 | 0.158 |
| n2 | 2.00 | 0.103 | 0.122 | 0.108 | 0.092 | 0.120 | 0.119 | 0.105 |
| n1 | 1.46 | 0.103 | 0.063 | 0.067 | 0.091 | 0.068 | 0.062 | 0.065 |
| n2 | 2.00 | 0.250 | 0.263 | 0.411 | 0.416 | 0.311 | 0.415 | 0.362 |
| n1 | 1.46 | 0.302 | 0.296 | 0.258 | 0.239 | 0.243 | 0.232 | 0.250 |

| Refractive index n | | Physical film thickness d [nm] | | | | | |
|---|---|---|---|---|---|---|---|
| | | Light-Blue | Blue | Purple | Pink | Mars-Yellow | Yellow | Green |
| n1 | 1.46 | 76.02 | 16.99 | 22.17 | 42.20 | 27.91 | 21.41 | 54.24 |
| n2 | 2.00 | 25.83 | 30.55 | 26.96 | 23.11 | 29.97 | 29.77 | 26.32 |
| n1 | 1.46 | 35.19 | 21.60 | 23.08 | 31.24 | 23.20 | 21.17 | 22.11 |
| n2 | 2.00 | 62.54 | 65.80 | 102.71 | 104.03 | 77.66 | 103.68 | 90.57 |
| n1 | 1.46 | 103.31 | 101.37 | 88.27 | 81.87 | 83.21 | 79.46 | 85.70 |

Fig. 10

| Refractive index n | | Optical film thickness nd | | | | | | |
|---|---|---|---|---|---|---|---|---|
| | | Light-Blue | Blue | Purple | Pink | Mars-Yellow | Yellow | Green |
| n1 | 1.46 | 0.311 | 0.057 | 0.065 | 0.145 | 0.083 | 0.067 | 0.298 |
| n2 | 2.00 | 0.108 | 0.104 | 0.086 | 0.082 | 0.100 | 0.097 | 0.110 |
| n1 | 1.46 | 0.072 | 0.074 | 0.080 | 0.089 | 0.075 | 0.075 | 0.069 |
| n2 | 2.00 | 0.272 | 0.261 | 0.400 | 0.365 | 0.305 | 0.400 | 0.290 |
| n1 | 1.46 | 0.286 | 0.297 | 0.256 | 0.246 | 0.242 | 0.231 | 0.258 |

| Refractive index n | | Physical film thickness d [nm] | | | | | | |
|---|---|---|---|---|---|---|---|---|
| | | Light-Blue | Blue | Purple | Pink | Mars-Yellow | Yellow | Green |
| n1 | 1.46 | 106.48 | 19.38 | 22.18 | 49.76 | 28.44 | 23.00 | 102.06 |
| n2 | 2.00 | 27.08 | 25.99 | 21.43 | 20.40 | 24.92 | 24.34 | 27.52 |
| n1 | 1.46 | 24.63 | 25.46 | 27.23 | 30.46 | 25.83 | 25.66 | 23.50 |
| n2 | 2.00 | 68.04 | 65.20 | 100.02 | 91.28 | 76.19 | 99.97 | 72.42 |
| n1 | 1.46 | 97.88 | 101.78 | 87.74 | 84.37 | 82.77 | 79.12 | 88.44 |

SPECTACLE LENS AND SPECTACLE

FIELD OF THE INVENTION

The present invention relates to a tinted spectacle lens and a spectacle using this lens.

BACKGROUND OF THE INVENTION

As tinted spectacle lenses, Patent Document 1 discloses a spectacle lens capable of being set up in an arbitrary color (see paragraphs 0002 and 0020). In Patent Document 1, it is described that an antireflection film is provided in such a tinted spectacle lens (see claims 1 and 2 and paragraphs 0001 and 0102).
Patent Document 1: JP-A-11-101901

DISCLOSURE OF THE INVENTION

Problems that the Invention is to Solve

Although Patent Document 1 describes that an antireflection film is merely provided on the foregoing tinted spectacle lens, it does not disclose how the antireflection film is specifically applied. In consequence, it is assumed that a general antireflection film is applied in the foregoing tinted spectacle lens. However, the antireflection film is generally designed so as to be slightly reflected at a wavelength corresponding to green or magenta in order to have a high transmittance in the whole visible region. Therefore, regardless of the given colors, the foregoing tinted spectacle lens may be extremely pale green or magenta reflected light because of the antireflection film. In such a tinted spectacle lens, when a person other than a spectacle wearing person sees this spectacle lens whose color and the color of the reflected light do not agree with each other, the color is changed depending upon whether or not the reflected light is viewed, and a flicker may appear, resulting in a lens appearance that is disfeaturing.

An object of the invention according to aspects 1 to 9 of the present invention is to provide a tinted spectacle lens having an excellent external appearance such that the color is not changed by reflection.

Further, another object of the invention according to a tenth aspect of the present invention is to provide a tinted spectacle having a spectacle lens having excellent external appearance such that the color of the lens is neither changed nor altered by reflection.

Means for Solving the Problems

In order to achieve the foregoing objects, the invention according to a first aspect of the present invention is characterized by providing a colored lens base material and an antireflection film provided on the lens base material, wherein reflected light by the antireflection film has chromaticity coordinates equal to coloration of the lens base material.

Further, the invention according to a second aspect of the present invention is characterized in that in the foregoing invention, the lens base material is made of plastic.

Furthermore, the invention according to a third aspect of the present invention is characterized in that in the foregoing invention, the lens base material is made of glass and a colorable hard coat layer is provided on the base material.

The invention according to a fourth aspect of the present invention is characterized in that a lens base material is colored with a color within a range of a quadrilateral surrounded by a straight line group of the following equations on an XYZ color system chromaticity diagram of the CIE color system:

$y=1.151x-0.012$ $y=1.151x+0.007$ $y=-2.800x+1.181$ $y=-2.800x+1.548$ and that reflected light by an antireflection film presents a color within a range of a quadrilateral surrounded by a straight line group of the following equations on the XYZ color system chromaticity diagram:

$y=0.720x+0.095$ $y=0.720x+0.164$ $y=-2.750x+1.205$ $y=-2.750x+1.639$

The invention according to a fifth aspect of the present invention is characterized in that a lens base material is colored with a color within a range of a quadrilateral surrounded by a straight line group of the following equations on an XYZ color system chromaticity diagram of the CIE color system:

$y=0.922x+0.020$ $y=0.922x+0.044$ $y=-5.000x+1.915$ $y=-5.000x+2.217$ and that reflected light by an antireflection film presents a color within a range of a quadrilateral surrounded by a straight line group of the following equations on the XYZ color system chromaticity diagram:

$y=0.806x-0.063$ $y=0.806x+0.053$ $y=-2.727x+1.354$ $y=-2.727x+1.792$

The invention according to a sixth aspect of the present invention is characterized in that a lens base material is colored with a color within a range of a quadrilateral surrounded by a straight line group of the following equations on an XYZ color system chromaticity diagram of the CIE color system:

$y=-1.250x+0.717$ $y=-1.250x+0.731$ $y=3.333x-0.717$ $y=3.333x-0.772$ and that reflected light by an antireflection film presents a color within a range of a quadrilateral surrounded by a straight line group of the following equations on the XYZ color system chromaticity diagram:

$y=0.864x-0.055$ $y=0.864x-0.005$ $y=-3.333x+1.087$ $y=-3.333x+1.548$

The invention according to a seventh aspect of the present invention is characterized in that a lens base material is colored with a color within a range of a quadrilateral surrounded by a straight line group of the following equations on an XYZ color system chromaticity diagram of the CIE color system:

$$y=0.636x+0.112$$

$$y=0.636x+0.127$$

$$y=-7.000x+2.510$$

$$y=-7.000x+2.594$$

and that reflected light by an antireflection film presents a color within a range of a quadrilateral surrounded by a straight line group of the following equations on the XYZ color system chromaticity diagram:

$$y=0.213x+0.048$$

$$y=0.213x+0.111$$

$$y=-3.529x+0.684$$

$$y=-3.529x+0.860$$

The invention according to an eighth aspect of the present invention is characterized in that a lens base material is colored with a color within a range of a quadrilateral surrounded by a straight line group of the following equations on an XYZ color system chromaticity diagram of the CIE color system:

$$y=0.849x+0.052$$

$$y=0.849x+0.069$$

$$y=-5.000x+1.590$$

$$y=-5.000x+1.900$$

and that reflected light by an antireflection film presents a color within a range of a quadrilateral surrounded by a straight line group of the following equations on the XYZ color system chromaticity diagram:

$$y=0.190x+0.119$$

$$y=0.190x+0.188$$

$$y=35.000x-5.242$$

$$y=35.000x-6.704$$

The invention according to a ninth aspect of the present invention is characterized in that a lens base material is colored with a color within a range of a quadrilateral surrounded by a straight line group of the following equations on an XYZ color system chromaticity diagram of the CIE color system:

$$y=0.417x+0.187$$

$$y=0.417x+0.202$$

$$y=-7.000x+2.338$$

$$y=-7.000x+2.516$$

and that reflected light by an antireflection film presents a color within a range of a quadrilateral surrounded by a straight line group of the following equations on the XYZ color system chromaticity diagram:

$$y=-0.107x+0.253$$

$$y=-0.107x+0.389$$

$$y=5.583x-0.686$$

$$y=5.583x-1.005$$

For the purpose of achieving the foregoing objects, the invention according to a tenth aspect of the present invention is characterized by a spectacle having a spectacle lens according to the foregoing invention.

ADVANTAGES OF THE INVENTION

According to the present invention, a spectacle lens or a spectacle which provides a natural and excellent external appearance such that even when a person other than a spectacle wearing person views reflected light, the color is not changed as compared with that before viewing.

BRIEF DESCRIPTION OF THE DRAWINGS

FIGS. 1A and 1B are a front explanatory view and a central cross-section explanatory view of a spectacle lens according to the present invention, respectively.

FIG. 2 is a table showing designed values (optical film thickness and physical film thickness) of the Examples according to a plastic-made spectacle lens with a refractive index of 1.6.

FIG. 10 is a table showing designed values (optical film thickness and physical film thickness) of the Examples according to a plastic-made spectacle lens with a refractive index of 1.5.

DETAILED DESCRIPTION OF THE INVENTION

Figure 3A:
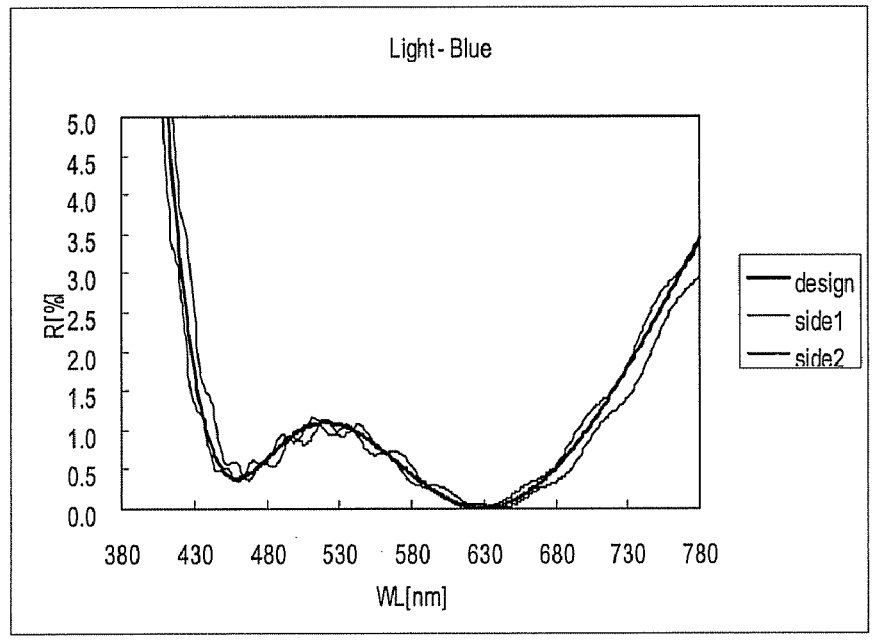
FIGS. 3A and 3B are reflectance distribution and a CIE chromaticity diagram according to Example 1, respectively.

First of all, a spectacle lens according to an embodiment of the present invention is described below by referring to the drawings. FIG. 1 is an explanatory drawing of a tinted spectacle lens 1, and the spectacle lens 1 is provided with a lens base material 2 and an antireflection film 5 provided on the lens base material 2 (an inner surface 3 and an outer surface 4 seen from the spectacle wearing person). The lens base material 2 is made of plastic and colored with a dye. The antireflection film (antireflection coating layer) 5 is formed by a vapor deposition method such that it slightly reflects incident light in the same color as that presented by the lens base material 2 and transmits all of the remainder.

The same color as referred to herein means that the chromaticity coordinate values (chromaticity indexes) are equal to each other; and although the chromaticity coordinates are favorably made on the basis of those according to the CIE color system, the RGB color system, the XYZ color system, the L*a*b* color system or the like may be employed in addition to the CIE color system. In the case where the chromaticity coordinates are equal, a component of light from the lens base material 2 per se (intensity distribution in the case where the wavelength chiefly exists in a visible region) and a component of reflected light by the antireflection film 5 are relatively equal to each other. Furthermore, the antireflection film 5 presents reflected light of the same color as the lens base material 2 by only one according to the inner surface 3 or presents reflected light of the same color as the lens base material 2 by only the outer surface 4. Alternatively, the whole antireflection film 5 including the inner surface 3 and the outer surface 4 may present the same color, or the inner surface, the outer surface, the inner and the outer surface may be properly combined.

Examples of materials of the lens base material 2 which is a plastic lens include acrylic resins, polycarbonate resins, polyurethane based resins, polyester based resins, episulfide resins, polyethersulfone resins, poly-4-methylpenene-1 resins and diethylene glycol distearyl carbonate resins.

Further, a hard coat layer or the like may be provided between the lens base material 2 and the antireflection film 5; and the lens base material 2 may be colored using a method of using a pigment or the like or may be obtained by providing a colorable cured film (hard coat layer) on glass. Furthermore, the antireflection film 5 may be provided by a sputtering method, an electrode position method, a plasma CVD method or the like in addition to a vacuum vapor deposition method.

On the other hand, the spectacle according to an embodiment of the present invention is a spectacle using the foregoing spectacle lenses 1 and is, for example, provided by edging the foregoing spectacle lenses 1 and then fitting them in a spectacle frame.

EXAMPLES

Examples of Spectacle Lens (Relatively Deeply Colored Plastic with a Refractive Index of 1.6)

Next, seven plastic-made lenses having a refractive index of about 1.6 which are adapted with the foregoing spectacle lens 1 and concerned with working examples of the present invention are described for every color (Examples 1 to 7). Here, the colors according to Examples 1 to 7 are light-blue, blue, purple, pink, Mars-yellow, yellow and green in order. In Examples 1 to 7, deep coloration is applied to both the lens base material 2 and the antireflection film 5 as compared with Examples 8 to 15 as described later.

In Examples 1 to 7, the spectacle lens 1 was prepared according to the procedures of formation of the lens base material 2, dyeing of the lens base material 2, formation of a hard coat layer on the surface (the inner surface 3 and the outer surface 4) of the lens base material 2 and formation of the antireflection film 5 on the hard coat layer.

Further, in Examples 1 to 7, a flat lens with a diopter of 0.00 having an optical characteristic with a refractive index of 1.594 and an Abbe's number of 42 was used as the lens base material 2. According to the formation method of the lens base material before the coloration, a uniform solution prepared by blending 0.03 parts by weight of dibutyltin dichloride as a catalyst with 100 parts by weight in total of 50 parts by weight of norbornene diisocyanate, 25 parts by weight of pentaerythritol tetrakis(3-mercaptopropionate) and 25 parts by weight of bis(mercaptomethyl)-3,6,9-trithia-1,1'-undecanediol is poured in a lens mold and cured by elevating so that the temperature is elevated to 130° C. from 20° C. over 20 hours.

Furthermore, in Examples 1 to 7, a solution obtained by adding log of, as a surfactant, EMAL 20T (manufactured by Kao Corporation) in one liter of water was used as a dyeing stock solution. A carrier agent may be added depending upon a lens to be dyed as the need arises.

In addition, in Examples 1 to 7, the lens base material 2 having a hard coat layer provided theron was set in a vacuum tank and subjected to an ion beam irradiation treatment with an oxygen ion (treatment condition: accelerating voltage at 500 V and accelerating current at 250 mA), and the five-layer antireflection film 5 was then fabricated on the inner surface 3 and the outer surface 4.

Then, in Examples 1 to 7, in view of spectral transmittance and spectral reflectance of the spectacle lens 1, respective chromaticity coordinate values of transmitted light and reflected light of each spectacle lens 1 thus obtained were calculated while using a D65 light source as a light source and setting a viewing angle at 2 degrees.

Example 1

In the present Example, a solution obtained by adding 0.8 g of DIANIX RED ACE (manufactured by DyStar Japan Ltd.), 3 g of DIANIX BLUE ACE (manufactured by the same company) and 0.2 g of DIANIX YELLLOW ACE (manufactured by the same company) in the dyeing stock solution was used as a dyeing solution, and a lens base material was dipped in this dyeing solution for 5 minutes in a state of keeping the liquid temperature at 90° C., thereby obtaining the light-blue colored lens base material 2.

Further, trial and error were repeated to obtain an antireflection film having a low reflectance as far as possible against reflected light having reflection distribution corresponding to the color of the lens base material 2 over the whole of a visible region. As a result, a designed value of the antireflection film 5 (expressing a designed value of the antireflection film 5 on the outer surface 4 in "Light Blue" in FIG. 2; a designed value of the antireflection film 5 on the inner surface 3 is also the same) presenting reflectance distribution as shown in FIG. 3A ("side 1" represents distribution of the outer surface 4; "side 2" represents distribution of the inner surface 3; "design" represents distribution as a whole of the antireflection film 5 including the inner surface antireflection film and the outer surface reflection film; R represents a reflectance (percents); and WL represents a wavelength (nanometers), hereinafter the same) was obtained, and the antireflection film 5 was formed in conformity with this designed value. Here, in obtaining the designed value, it was determined to have a five-layer structure in which $SiO_2$ with a refractive index of 1.46 is an odd-numbered layer, and $ZrO_2$ with a refractive index of 2.00 is an even-numbered layer on each of the inner surface 3 and the outer surface 4, and an optical film thickness of each layer was changed little by little.

In FIG. 2 (common in each color), a central wavelength λ is 500 nm (nanometers). Further, in FIG. 2 (common in each other), the relationship among an optical film thickness nd, a physical film thickness d (nm) and a refractive index n (here, 1.6) is as follows.

$$nd = d/500 \times n$$

Particularly, in light-blue, the design was made such that a wavelength region corresponding to blue is relatively slightly reflected; a wavelength region corresponding to green on the side close to blue is relatively largely reflected; and a wavelength region corresponding to red is not reflected. The wavelength at which the reflectance is minimum (substantially 0) is here in the vicinity of 630 nm; and the wavelength at which the reflectance is maximum (here, about 1.0%) is here 520 nm.

Figure 3B:
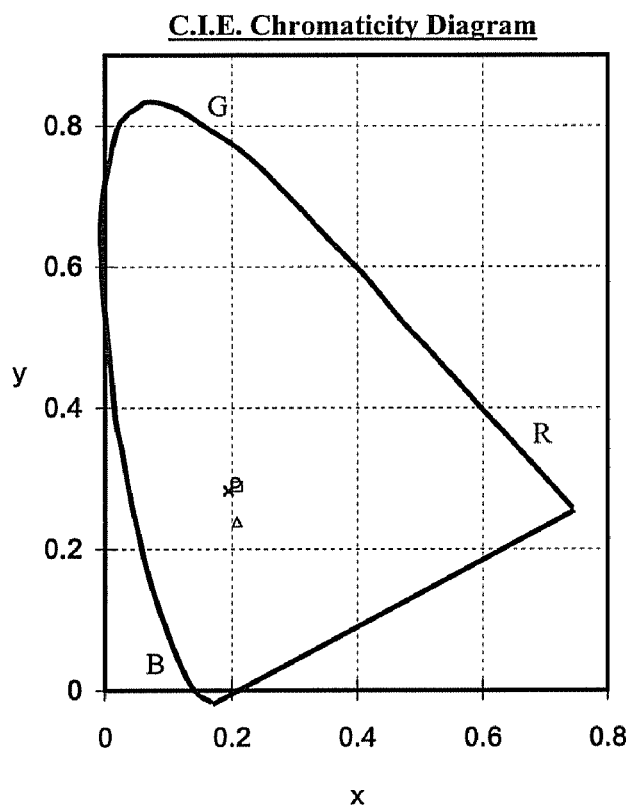

In the thus prepared tinted spectacle lens 1 of light-blue, the chromaticity coordinates of the lens base material 2 per se and the chromaticity coordinates of the reflected color by the antireflection film 5 were calculated, thereby obtaining the results as shown in FIG. 3B. FIG. 3B is a diagram obtained by plotting the chromaticity coordinates of reflected light according to only the antireflection film 5 on the outer surface 4 ("side 1", X; hereinafter the same), the chromaticity coordinates of reflected light according to only the antireflection film 5 on the inner surface 3 ("side 2", Δ; hereinafter the same), the chromaticity coordinates of the whole of the antireflection film 5 including the both antireflection films of the inner surface and the outer surface ("design", ○; hereinafter the same) and the chromaticity coordinates of dyeing of the lens base material 2 (□; hereafter the same) in conformity with the XYZ color system chromaticity diagram of the CIE color system (C.I.E. Chromaticity Diagram). As is clear from this diagram, the chromaticity coordinates of "side 1" and the chromaticity coordinates of the lens base material 2 are equal to each other; and the chromaticity of "side 2" and the chromaticity of the lens base material 2 are equal to each other. Further, the chromaticity coordinates of "design" and the chromaticity coordinates of the lens base material 2 are equal to each other.

Example 2

In the present Example, a solution obtained by adding 1 g of the foregoing DIANIX RED ACE and 3 g of the foregoing DIANIX BLUE ACE in the dyeing stock solution was used as a dyeing solution, and a lens base material was dipped in this dyeing solution for 5 minutes in a state of keeping the liquid temperature at 90° C., thereby obtaining the blue colored lens base material 2.

Figure 4A:
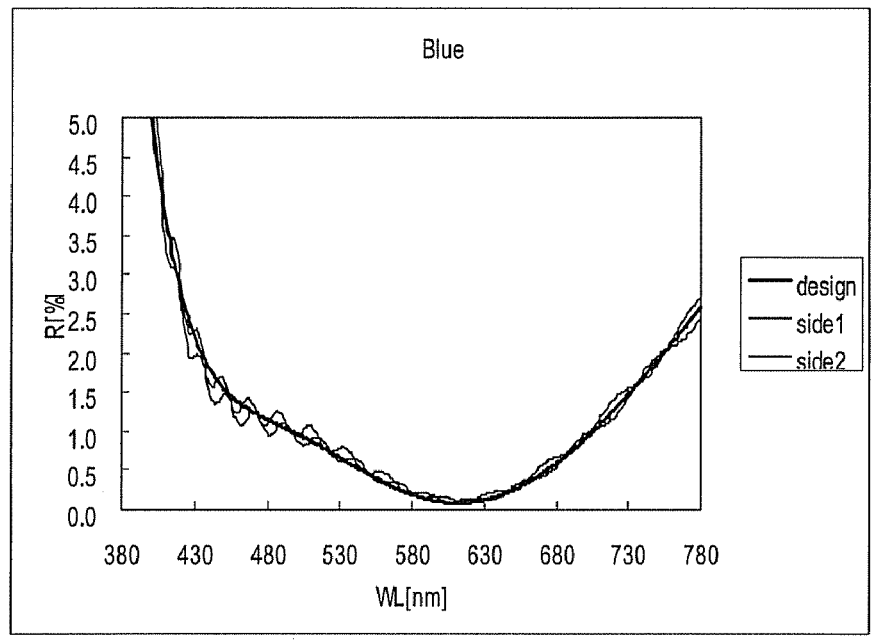
FIGS. 4A and 4B are reflectance distribution and a CIE chromaticity diagram according to Example 2, respectively.

Further, trial and error were repeated to obtain an antireflection film having a low reflectance as far as possible against reflected light having reflection distribution corresponding to the color of this lens base material 2 over the whole of a visible region. As a result, a designed value of the antireflection film 5 (expressing a designed value of the antireflection film 5 on the outer surface 4 in "Blue" in FIG. 2; a designed value of the antireflection film 5 on the inner surface 3 is also the same) presenting reflectance distribution as shown in FIG. 4A was obtained, and the antireflection film 5 was formed in conformity with this designed value. Here, in obtaining the designed value, it was determined to have a five-layer structure in which $SiO_2$ with a refractive index of 1.46 is an odd-numbered layer, and $ZrO_2$ with a refractive index of 2.00 is an even-numbered layer on each of the inner surface 3 and the outer surface 4, and an optical film thickness of each layer was changed little by little.

Particularly, in blue, the design was made such that a wavelength region corresponding to blue is relatively largely reflected; a wavelength region corresponding to green is not reflected as far as possible; and a wavelength region corresponding to red is not reflected. The wavelength at which the reflectance is minimum (substantially 0) is here in the vicinity of 610 nm.

Figure 4B:
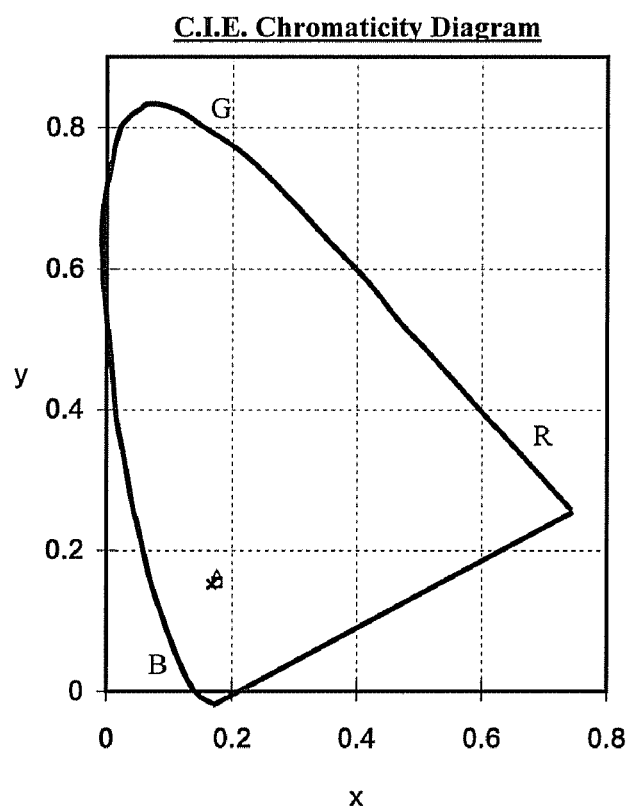

In the thus prepared tinted spectacle lens 1 of blue, the chromaticity coordinates of the lens base material 2 per se and the chromaticity coordinates of the reflected color by the antireflection film 5 were calculated, thereby obtaining the results as shown in FIG. 4B. FIG. 4B is a diagram obtained by plotting the chromaticity coordinates of reflected light according to only the antireflection film 5 on the outer surface 4, the chromaticity coordinates of reflected light according to only the antireflection film 5 on the inner surface 3, the chromaticity coordinates of the whole of the antireflection film 5 including the antireflection films of the inner surface and the outer suaface and the chromaticity coordinates of dyeing of the lens base material 2 in conformity with the XYZ color system chromaticity diagram of the CIE color system. As is clear from this diagram, the chromaticity coordinates of "side 1" and the chromaticity coordinates of the lens base material 2 are equal to each other; and the chromaticity coordinates of "side 2" and the chromaticity coordinates of the lens base material 2 are equal to each other. Also, the chromaticity coordinates of "design" and the chromaticity coordinates of the lens base material 2 are equal to each other.

Example 3

In the present Example, a solution obtained by adding 2 g of the foregoing DIANIX RED ACE and 2 g of the foregoing DIANIX BLUE ACE in the dyeing stock solution was used as a dyeing solution, and a lens base material was dipped in this dyeing solution for 5 minutes in a state of keeping the liquid temperature at 90° C., thereby obtaining the purple colored lens base material 2.

Figure 5A:
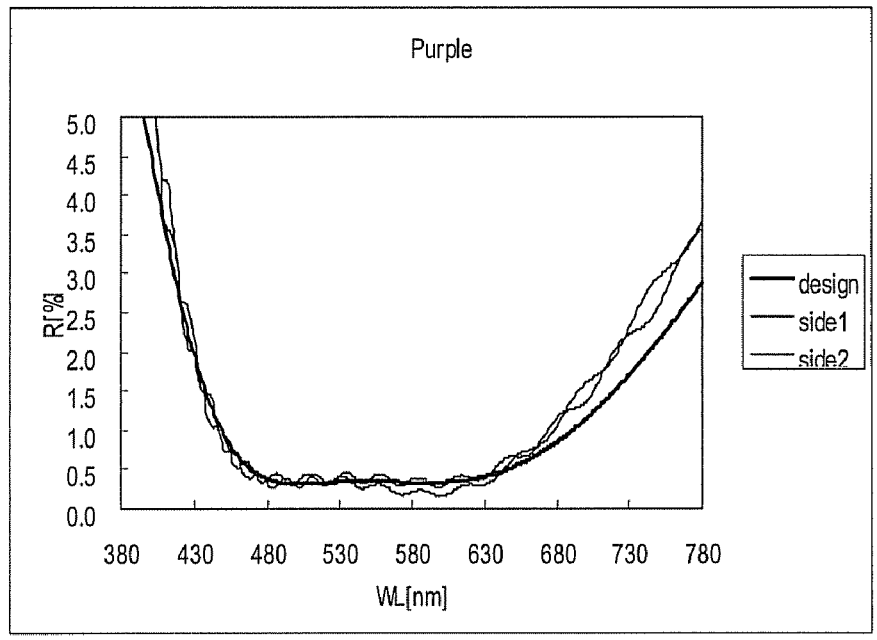
FIGS. 5A and 5B are reflectance distribution and a CIE chromaticity diagram according to Example 3, respectively.

Further, trial and error were repeated to obtain an antireflection film having a low reflectance as far as possible against reflected light having reflection distribution corresponding to the color of this lens base material 2 over the whole of a visible region. As a result, a designed value of the antireflection film 5 (expressing a designed value of the antireflection film 5 on the outer surface 4 in "Purple" in FIG. 2; a designed value of the antireflection film 5 on the inner surface 3 is also the same) presenting reflectance distribution as shown in FIG. 5A was obtained, and the antireflection film 5 was formed in conformity with this designed value. Here, in obtaining the designed value, it was determined to have a five-layer structure in which $SiO_2$ with a refractive index of 1.46 is an odd-numbered layer, and $ZrO_2$ with a refractive index of 2.00 is an even-numbered layer on each of the inner surface 3 and the outer surface 4, and an optical film thickness of each layer was changed little by little.

Particularly, in purple, the design was made such that the reflectance is a constant value close to 0 (here, 0.3%) as far as possible over the whole of a visible region.

Figure 5B:
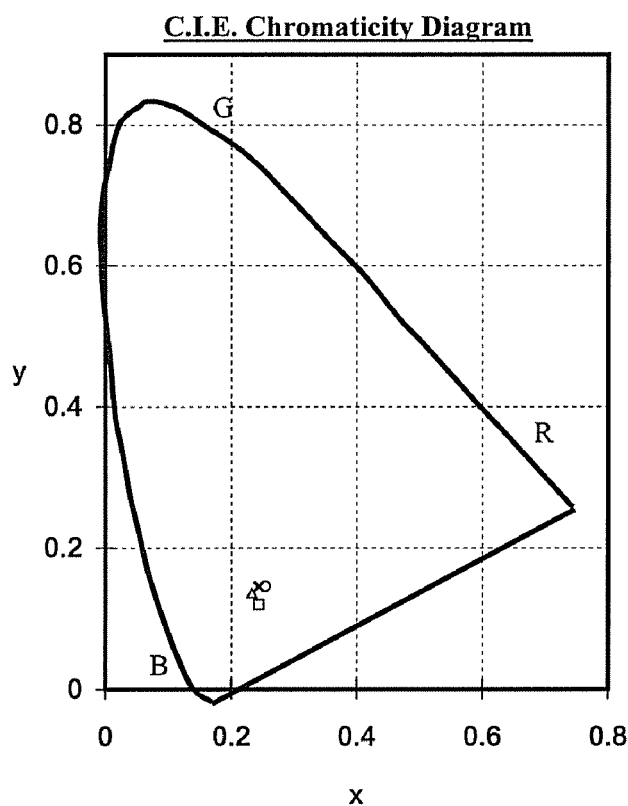

In the thus prepared tinted spectacle lens 1 of purple, the chromaticity coordinates of the lens base material 2 per se and the chromaticity coordinates of the reflected color by the antireflection film 5 were calculated, thereby obtaining the results as shown in FIG. 5B. FIG. 5B is a diagram obtained by plotting the chromaticity coordinates of reflected light according to only the antireflection film 5 on the outer surface 4, the chromaticity coordinates of reflected light according to only the antireflection film 5 on the inner surface 3, the chromaticity coordinates of the whole of the antireflection film 5 including the antireflection films of the inner surface and the outer surface and the chromaticity coordinates of dyeing of the lens base material 2 in conformity with the XYZ color system chromaticity diagram of the CIE color system. As is clear from this diagram, the chromaticity coordinates of "side 1" and the chromaticity coordinates of the lens base material 2 are equal to each other; and the chromaticity coordinates of "side 2" and the chromaticity coordinates of the lens base material 2 are equal to each other. Further, the chromaticity coordinates of "design" and the chromaticity coordinates of the lens base material 2 are equal to each other.

Example 4

In the present Example, a solution obtained by adding 4 g of the foregoing DIANIX RED ACE in the dyeing stock solution was used as a dyeing solution, and a lens base material was dipped in this dyeing solution for 5 minutes in a state of keeping the liquid temperature at 90° C., thereby obtaining the pink colored lens base material.

Figure 6A:
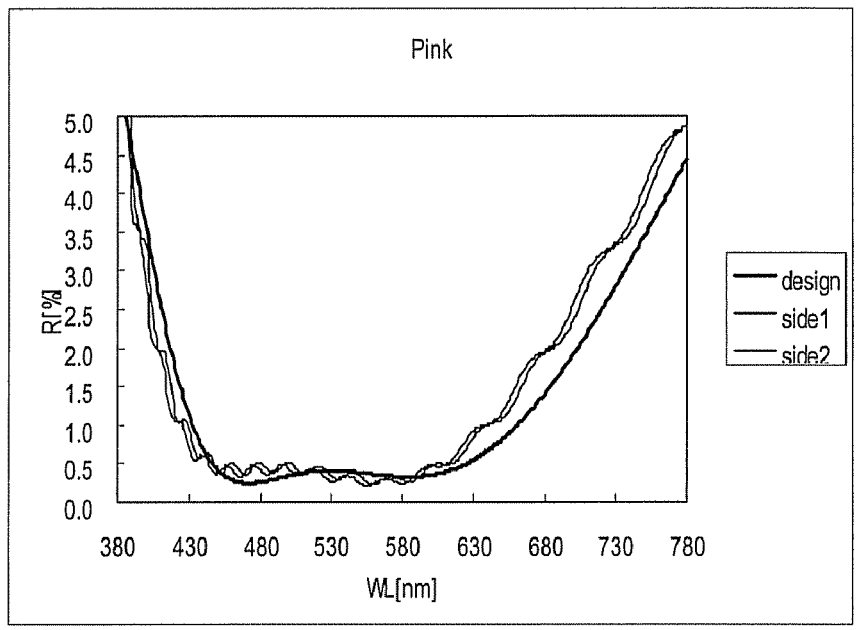
FIGS. 6A and 6B are reflectance distribution and a CIE chromaticity diagram according to Example 4, respectively.

Further, trial and error were repeated to obtain an antireflection film having a low reflectance as far as possible against reflected light having reflection distribution corresponding to the color of this lens base material 2 over the whole of a visible region. As a result, a designed value of the antireflection film 5 (expressing a designed value of the antireflection film 5 on the outer surface 4 in "Pink" in FIG. 2; a designed value of the antireflection film 5 on the inner surface 3 is also the same) presenting reflectance distribution as shown in FIG. 6A was obtained, and the antireflection film 5 was formed in conformity with this designed value. Here, in obtaining the designed value, it was determined to have a five-layer structure in which $SiO_2$ with a refractive index of 1.46 is an odd-numbered layer, and $ZrO_2$ with a refractive index of 2.00 is an even-numbered layer on each of the inner surface 3 and the outer surface 4, and an optical film thickness of each layer was changed little by little.

Particularly, in pink, the design was made such that in comparison with "purple", the reflectance in a wavelength region corresponding to blue is slightly decreased (about 0.1%); the reflectance in a wavelength region corresponding to red is slightly increased (about 0.1%); and following this, the reflectance in a wavelength region corresponding to green is slightly increased (about 0.1%). In other words, a wavelength region corresponding to blue is reflected relatively a little, while relatively largely reflecting a wavelength region corresponding to red. The wavelength at which the reflectance is maximum (here, about 0.5%) is here 530 nm.

Figure 6B:
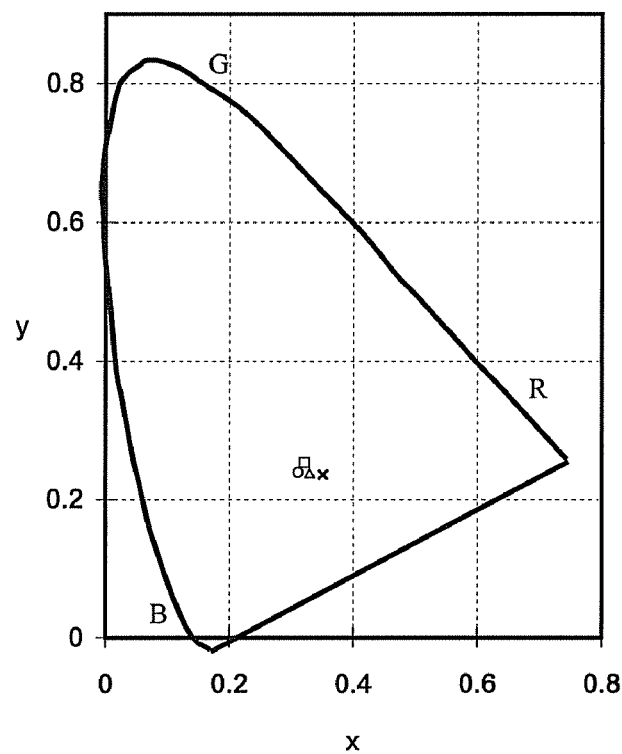

In the thus prepared tinted spectacle lens 1 of pink, the chromaticity coordinates of the lens base material 2 per se and the chromaticity coordinates of the reflected color by the antireflection film 5 were calculated, thereby obtaining the results as shown in FIG. 6B. FIG. 6B is a diagram obtained by plotting the chromaticity coordinates of reflected light according to only the antireflection film 5 on the outer surface 4, the chromaticity coordinates of reflected light according to only the antireflection film 5 on the inner surface 3, the chromaticity coordinates of the whole of the antireflection film 5 including the antireflection films of the inner surface and the outer surface and the chromaticity coordinates of dyeing of the lens base material 2 in conformity with the XYZ color system chromaticity diagram of the CIE color system. As is clear from this diagram, the chromaticity coordinates of "side 1" and the chromaticity coordinates of the lens base material 2 are equal to each other; and the chromaticity coordinates of "side 2" and the chromaticity coordinates of the lens base material 2 are equal to each other. Further, the chromaticity coordinates of "design" and the chromaticity coordinates of the lens base material 2 are equal to each other.

Example 5

In the present Example, a solution obtained by adding 2 g of the foregoing DIANIX RED ACE and 2 g of the foregoing DIANIX YELLOW ACE in the dyeing stock solution was used as a dyeing solution, and a lens base material was dipped in this dyeing solution for 5 minutes in a state of keeping the liquid temperature at 90° C., thereby obtaining the Mars-yellow colored lens base material 2.

Figure 7A:
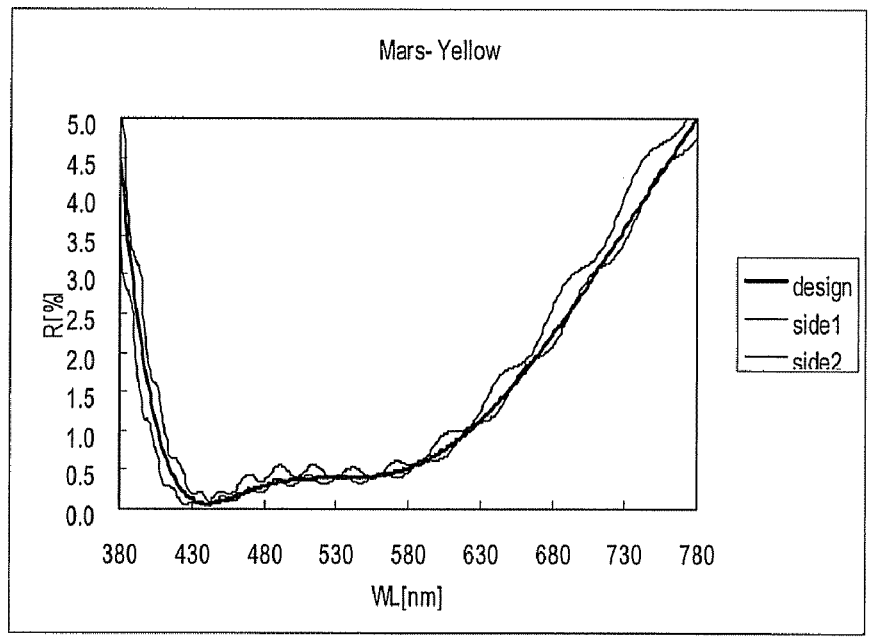
FIGS. 7A and 7B are reflectance distribution and a CIE chromaticity diagram according to Example 5, respectively.

Further, trial and error were repeated to obtain an antireflection film having a low reflectance as far as possible against reflected light having reflection distribution corresponding to the color of this lens base material 2 over the whole of a visible region. As a result, a designed value of the antireflection film 5 (expressing a designed value of the antireflection film 5 on the outer surface 4 in "Mars-Yellow" in FIG. 2; a designed value of the antireflection film 5 on the inner surface 3 is also the same) presenting reflectance distribution as shown in FIG. 7A was obtained, and the antireflection film 5 was formed in conformity with this designed value. Here, in obtaining the designed value, it was determined to have a five-layer structure in which $SiO_2$ with a refractive index of 1.46 is an odd-numbered layer, and $ZrO_2$ with a refractive index of 2.00 is an even-numbered layer on each of the inner surface 3 and the outer surface 4, and an optical film thickness of each layer was changed little by little.

Particularly, in Mars-yellow, the design was made such that a wavelength region corresponding to green is not reflected as far as possible (here, reflection of about 0.5%), and a wavelength region corresponding to blue is not reflected while relatively largely reflecting a wavelength region corresponding to red. The wavelength at which the reflectance is minimum (substantially 0) is here in the vicinity of 440 nm.

Figure 7B:
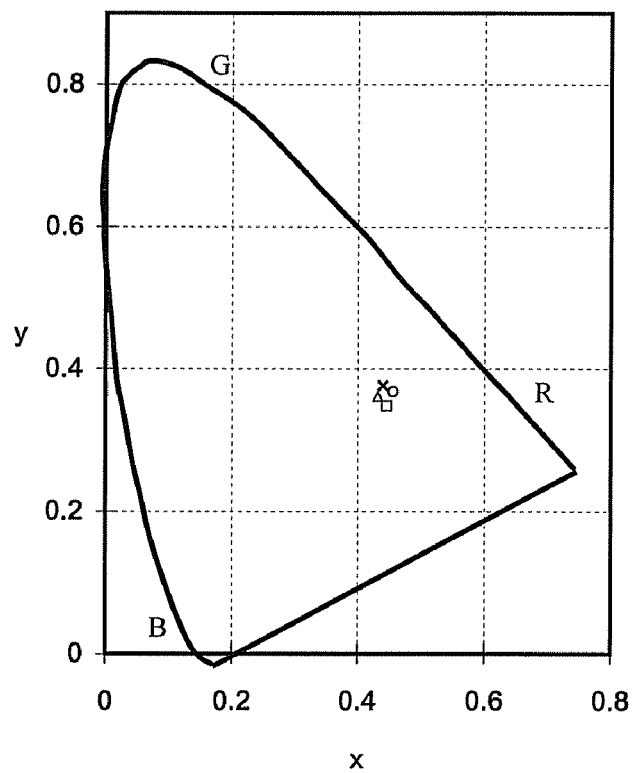

In the thus prepared tinted spectacle lens 1 of Mars-yellow, the chromaticity coordinates of the lens base material 2 per se and the chromaticity coordinates of the reflected color by the antireflection film 5 were calculated, thereby obtaining the results as shown in FIG. 7B. FIG. 7B is a diagram obtained by plotting the chromaticity coordinates of reflected light according to only the antireflection film 5 on the outer surface 4, the chromaticity coordinates of reflected light according to only the antireflection film 5 on the inner surface 3, the chromaticity coordinates of the whole of the antireflection film 5 including the antireflection films of the inner surface and the outer surface and the chromaticity coordinates of dyeing of the lens base material 2 in conformity with the XYZ color system chromaticity diagram of the CIE color system. As is clear from this diagram, the chromaticity coordinates of "side 1" and the chromaticity coordinates of the lens base material 2 are equal to each other; and the chromaticity coordinates of "side 2" and the chromaticity coordinates of the lens base material 2 are equal to each other. Also, the chromaticity coordinates of "design" and the chromaticity coordinates of the lens base material 2 are equal to each other.

Example 6

In the present Example, a solution obtained by adding 4 g of the foregoing DIANIX YELLOW ACE in the dyeing stock solution was used as a dyeing solution, and a lens base material was dipped in this dyeing solution for 5 minutes in a state of keeping the liquid temperature at 90° C., thereby obtaining the yellow colored lens base material.

Figure 8A:
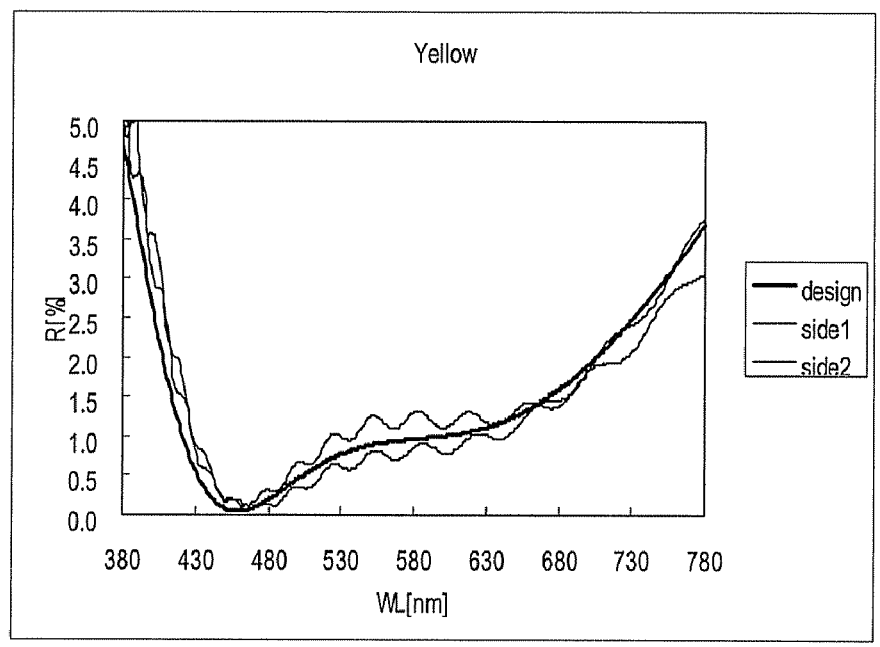
FIGS. 8A and 8B are reflectance distribution and a CIE chromaticity diagram according to Example 6, respectively.

Further, trial and error were repeated to obtain an antireflection film having a low reflectance as far as possible against reflected light having reflection distribution corresponding to the color of this lens base material 2 over the whole of a visible region. As a result, a designed value of the antireflection film 5 (expressing a designed value of the antireflection film 5 on the outer surface 4 in "Yellow" in FIG. 2; a designed value of the antireflection film 5 on the inner surface 3 is also the same) presenting reflectance distribution as shown in FIG. 8A was obtained, and the antireflection film 5 was formed in conformity with this designed value. Here, in obtaining the designed value, it was determined to have a five-layer structure in which $SiO_2$ with a refractive index of 1.46 is an odd-numbered layer, and $ZrO_2$ with a refractive index of 2.00 is an even-numbered layer on each of the inner surface 3 and the outer surface 4, and an optical film thickness of each layer was changed little by little.

Particularly, in yellow, the design was made such that in comparison with "Mars-yellow", the reflectance in a wavelength region corresponding to green is about 2 times (here, about 1.0%) while presenting a reflectance substantially equal in a wavelength region corresponding to red, namely a wavelength region corresponding to green is not reflected so much while relatively largely reflecting a wavelength region corresponding to red; and a wavelength region corresponding to blue is not reflected. The wavelength at which the reflectance is minimum (substantially 0) is here in the vicinity of 440 nm.

Figure 8B:
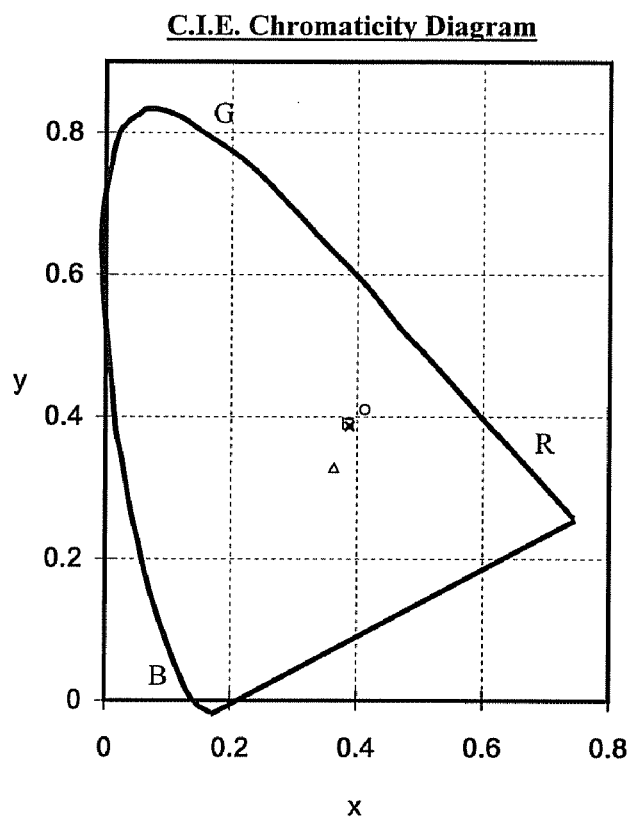

In the thus prepared tinted spectacle lens 1 of yellow, the chromaticity coordinates of the lens base material 2 per se and the chromaticity coordinates of the reflected color by the antireflection film 5 were calculated, thereby obtaining the results as shown in FIG. 8B. FIG. 8B is a diagram obtained by plotting the chromaticity coordinates of reflected light according to only the antireflection film 5 on the outer surface 4, the chromaticity coordinates of reflected light according to only the antireflection film 5 on the inner surface 3, the chromaticity coordinates of the whole of the antireflection film 5 including the antireflection films of the inner surface and the outer surface and the chromaticity coordinates of dyeing of the lens base material 2 in conformity with the XYZ color system chromaticity diagram of the CIE color system. As is clear from this diagram, the chromaticity coordinates of "side 1" and the chromaticity coordinates of the lens base material 2 are equal to each other; and the chromaticity coordinates of "side 2" and the chromaticity coordinates of the lens base material 2 are equal to each other. Further, the chromaticity coordinates of "design" and the chromaticity coordinates of the lens base material 2 are equal to each other.

Example 7

In the present Example, a solution obtained by adding 2 g of the foregoing DIANIX BLUE ACE and 2 g of the foregoing DIANIX YELLOW ACE in the dyeing stock solution was used as a dyeing solution, and a lens base material was dipped in this dyeing solution for 5 minutes in a state of keeping the liquid temperature at 90° C., thereby obtaining the green colored lens base material.

Figure 9A:
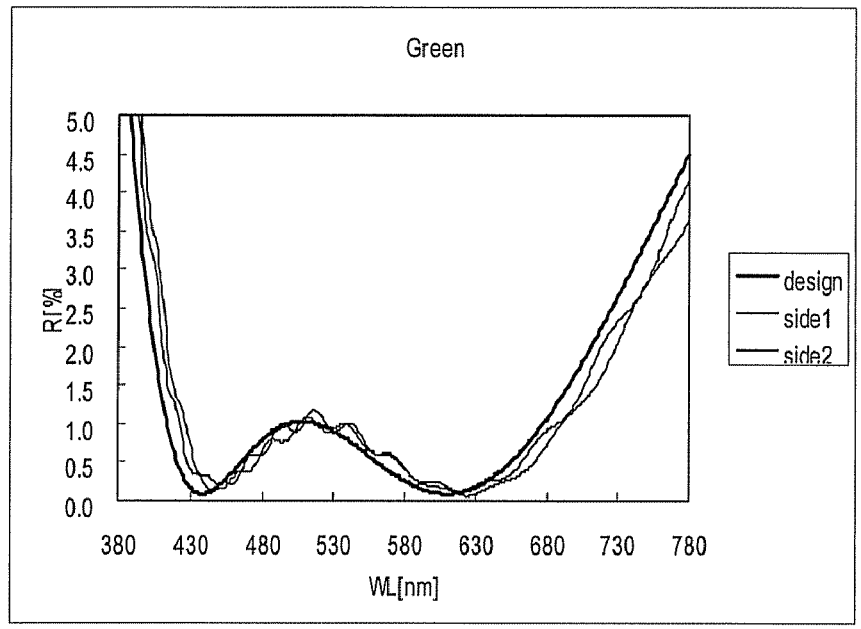
FIGS. 9A and 9B are reflectance distribution and a CIE chromaticity diagram according to Example 7, respectively.

Further, trial and error were repeated to obtain an antireflection film having a low reflectance as far as possible against reflected light having reflection distribution corresponding to the color of this lens base material 2 over the whole of a visible region. As a result, a designed value of the antireflection film 5 (expressing a designed value of the antireflection film 5 on the outer surface 4 in "Green" in FIG. 2; a designed value of the antireflection film 5 on the inner surface 3 is also the same) presenting reflectance distribution as shown in FIG. 9A was obtained, and the antireflection film 5 was formed in conformity with this designed value. Here, in obtaining the designed value, it was determined to have a five-layer structure in which $SiO_2$ with a refractive index of 1.46 is an odd-numbered layer, and $ZrO_2$ with a refractive index of 2.00 is an even-numbered layer on each of the inner surface 3 and the outer surface 4, and an optical film thickness of each layer was changed little by little.

Particularly, in green, the design was made such that a wavelength region corresponding to green is relatively largely reflected (here, about 1.0%) while not reflecting a wavelength region corresponding to red and a wavelength region corresponding to blue. The wavelength at which the reflectance is minimum (substantially 0) is here in the vicinity of 440 nm and in the vicinity of 610 nm; and the wavelength at which the reflectance is maximum (here, about 1.0%) is here 500 nm.

Figure 9B:
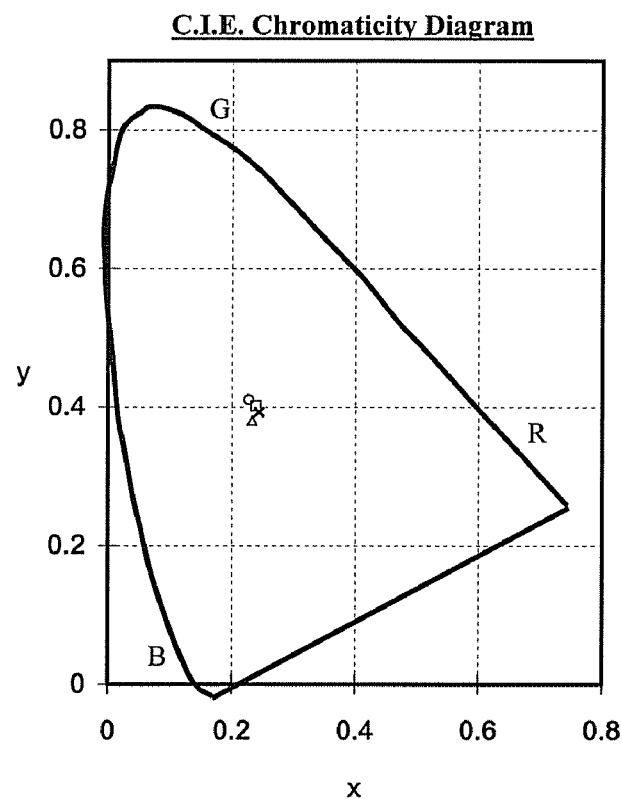

In the thus prepared tinted spectacle lens 1 of green, the chromaticity coordinates of the lens base material 2 per se and the chromaticity coordinates of the reflected color by the antireflection film 5 were calculated, thereby obtaining the results as shown in FIG. 9B. FIG. 9B is a diagram obtained by plotting the chromaticity coordinates of reflected light according to only the antireflection film 5 on the outer surface 4, the chromaticity coordinates of reflected light according to only the antireflection film 5 on the inner surface 3, the chromaticity coordinates of the whole of the antireflection film 5 including the antireflection films of the inner surface and the outer surface and the chromaticity coordinates of dyeing of the lens base material 2 in conformity with the XYZ color system chromaticity diagram of the CIE color system. As is clear from this diagram, the chromaticity coordinates of "side 1" and the chromaticity coordinates of the lens base material 2 are equal to each other; and the chromaticity coordinates of "side 2" and the chromaticity coordinates of the lens base material 2 are equal to each other. Further, the chromaticity coordinates of "design" and the chromaticity coordinates of the lens base material 2 are equal to each other.

In this way, seven types of the plastic-made spectacle lens 1 with a refractive index of about 1.6 in which the color of the lens base material and the color of the reflected light are identical with each other were obtained (Examples 1 to 7). Then, by considering their natural colors and complementary colors and the like, it is possible to obtain the foregoing spectacle lens 1 in which the color of the lens base material 2 and the color of the reflected light are identical with each other in an arbitrary color.

<Examples of Spectacle Lens (Plastic with a Refractive Index of 1.5)

In case of spectacle lenses which are substantially the same as those in the foregoing Examples, except that only the lens base material 2 is changed to CR39 (diethylene glycol diallyl carbonate, refractive index: 1.5), one example of the designed value of the antireflection film 5 (one according to the outer surface 4 is the same as one according to the inner surface) is shown in FIG. 10. In FIG. 10 (common in each color), a central wavelength λ is 500 nm (nanometers). Further, in FIG. 10 (common in each other), the relationship among an optical film thickness nd, a physical film thickness d (nm) and a refractive index n (here, 1.5) is as follows.

$$nd=d/500\times n$$

By providing the antireflection film 5 according to such a designed value on each of the thus dyed lens base materials 2, it is possible to obtain the spectacle lens 1 in which the color of the CR39-made lens base material 2 and the color of the reflected light are identical with each other. Then, by referring to the foregoing Examples, the spectacle lens 1 according to an arbitrary plastic in which the color of the lens base material 2 and the color of the reflected light are identical with each other is obtained.

<Examples of Spectacle Lens (Glass Having a Colorable Hard Coat Layer)>

By providing a dyeable hard coat layer (cured film) on a glass-made base material to fabricate the lens base material 2 and coloring it, the antireflection film 5 having the same color can also be provided in the same manner as in the plastic while taking into consideration the quality of the hard coat layer. Examples of a hard coat agent for forming the foregoing hard coat layer include silicon based materials (for example, methylmethoxysilane, methyltrimethoxysilane, methyltributoxysilane, ethyltrimethoxysilane, ethyltriethoxysilane, dimethyldimethoxysilane, dimethyldiethoxysilane, etc.); thermosetting paints containing, as major components, a partial condensate of colloidal silica and a silanol and a crosslinking agent; and thermosetting paints composed of colloidal silica, an epoxy group-containing alkoxysilane and a polyfunctional epoxy compound.

<Examples of Spectacle Lens (Relatively Palely Colored Plastic with a Refractive Index of 1.6)>

Subsequently, six plastic-made lenses having a refractive index of about 1.6 which are adapted with the foregoing spectacle lens 1 and concerned with working examples of the present invention are described for every color (Examples 8 to 13). Here, the colors according to Examples 8 to 13 are yellow, Mars-yellow, pink, purple, blue and aqua (light-blue) in order. In Examples 8 to 13, pale coloration is applied to the lens base material 2 and the antireflection film 5 as compared with Examples 1 to 7. In particular, the lens base material 2 is palely colored, and therefore, there may be the case where it may not be said that the chromaticity coordinates of the lens base material 2 and the chromaticity coordinates of the antireflection film are equal to each other.

In Examples 8 to 13, the preparation of the spectacle lens 1 is carried out in the same manner as in Examples 1 to 7, except that the weight of the dyeing solution regarding dyeing of the lens base material 2 is made smaller and that the design of the antireflection film 5 is slightly changed so as to have the chromaticity coordinates shown in each of the Examples. Further, in Examples 8 to 13, the calculation of the chromaticity coordinates of the spectacle lens 1 is made in the same manner as in Examples 1 to 7.

Example 8

Figure 11A:
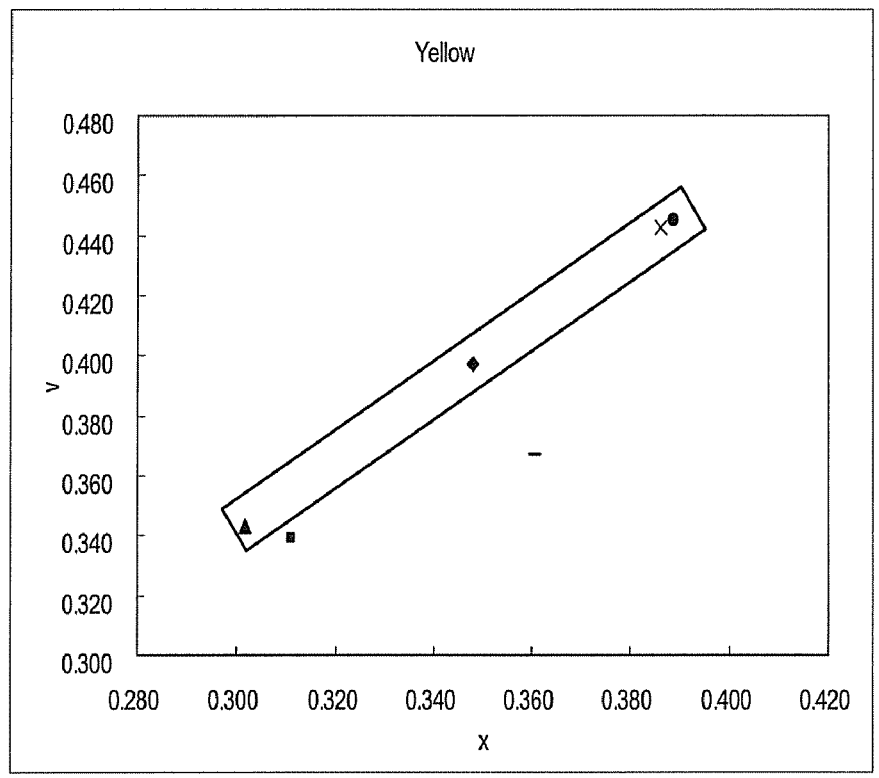
FIGS. 11A and 11B are a CIE chromaticity diagram of a lens base material and a CIE chromaticity diagram of an antireflection film according to Example 8, respectively.
Figure 11B:
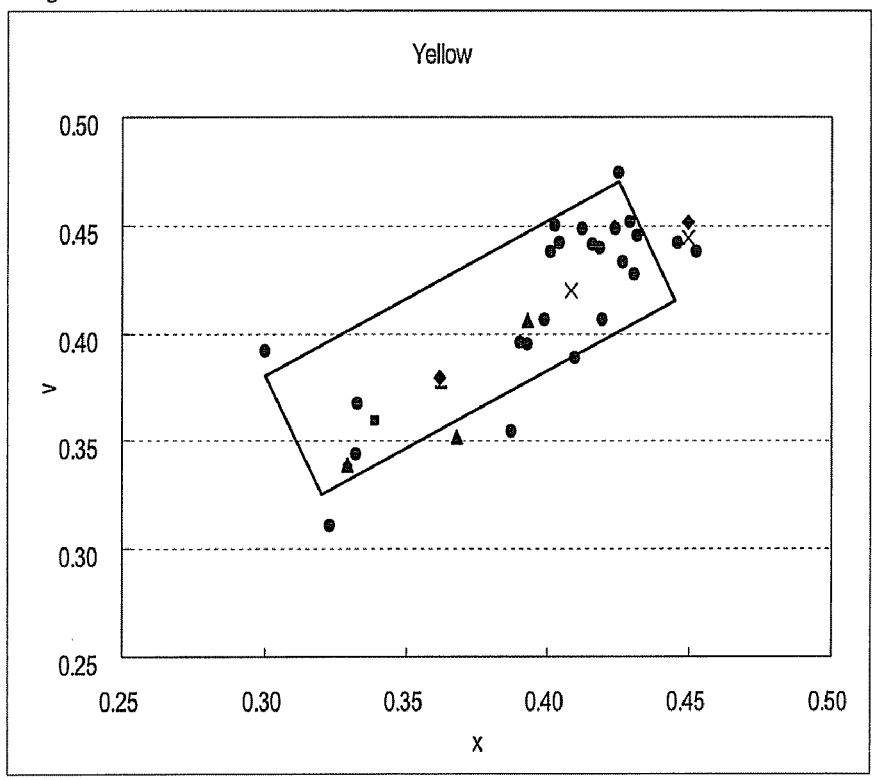

FIG. 11A is a diagram obtained by plotting respective chromaticity coordinates of transmitted light of the plural number of the yellow colored lens base materials 2 in the XYZ color system chromaticity diagram of the CIE color system; and FIG. 11B is a diagram obtained by plotting respective chromaticity coordinates of reflected light which the antireflection film 5 provided on the lens base material 2 presents in the subject chromaticity diagram. The chromaticity coordinates of reflected light by the antireflection film 5 provided on the lens base material 2 colored with a color according to the chromaticity coordinates of a plot shape "●" in FIG. 11A are shown by the same plot shape "●" in FIG. 11B; and the same is also applicable with respect to plot shapes "X", "▲", "■", "♦" and "-". In the present Example, the spectacle lenses 1 in the number of the plots in FIG. 11B are prepared (including those by computer simulation).

Then, as a result of mutual comparison of these spectacle lenses 1 by a color coordinator, an inventor and other means, it was noted that the spectacle lenses 1 having the following chromaticity coordinates in FIG. 11B were yellow, however, the color was changed through the reflection and flicker occurs.

That is, as to "●", six points of (x, y)=(0.300, 0.392), (0.323, 0.311), (0.425, 0.474), (0.39, 0.355), (0.44, 0.44) and (0.453, 0.438) fall within it; as to "X", one point of (x, y)=(0.45, 0.44) falls within it; as to "▲", one point of (x, y)=(0.37, 0.35) falls within it; and as to "♦", one point of (x, y)=(0.45, 0.45) falls within it.

In consequence, it is found that flicker can be prevented from occurring by making the range of the chromaticity coordinates (chromaticity range) of the antireflection film 5 fall within a range of a quadrilateral surrounded by a straight line group of the following equations (hereinafter referred to as "chromaticity range A2").

$y=0.720x+0.095$ $y=0.720x+0.164$ $y=-2.750x+1.205$ $y=-2.750x+1.639$

Further, to prevent a change of the external appearance color at the time of reflection, the chromaticity range of the lens base material 2 corresponding to the foregoing chromaticity range of the antireflection film 5 is defined to fall within a range of a quadrilateral surrounded by a straight line group of the following equations (hereinafter referred to as "chromaticity range A1"), not so far from the spectacle lens 1 according to the present Example. This is defined with consideration of the chromaticity coordinate values of other yellow colored spectacle lenses 1. In the subject chromaticity range A1, since the color is pale as a whole as compared with Examples 1 to 7 (especially Example 6), when the results of Examples 1 to 7 (especially Example 6) are also taken into consideration, it is noted that even by making it corresponding to the foregoing chromaticity range A2 of the antireflection film 5, it is possible to sufficiently prevent a flickering phenomenon of the external appearance from occurring.

$y=1.151x-0.012$ $y=1.151x+0.007$ $y=-2.800x+1.181$ $y=-2.800x+1.548$

With respect to the plots "■" and "-", though they fall within the chromaticity range A2 in FIG. 11B, they do not fall within the chromaticity range A1 in FIG. 11A, and it was observed that as to the respective spectacle lenses 1 according to these plots, the color of the transmitted light and the color of the reflected light do not agree with each other. Here, the respective chromaticity coordinate values are (x, y)=(0.360, 0367) and (x, y)=(0.311, 0.339) in order.

In this way, by coloring the lens base material 2 into a color according to the chromaticity coordinate value corresponding to any one of the points falling within the chromaticity range A1 and forming the antireflection film 5 presenting the reflected color according to the chromaticity coordinate value corresponding to any one of the points falling within the chromaticity range A2 on the lens base material 2, it is possible to provide a spectacle lens according to yellow which is viewed such that the color of the transmitted light of the lens based material 2 according to yellow and the color of the reflected light of the antireflection film 5 agree with each other, which prevents a phenomenon where these colors are seen different from each other from occurring, is free from changes of the color against incident lights from various directions and has an external appearance with a consolidated feeling.

Example 9

Figure 12:
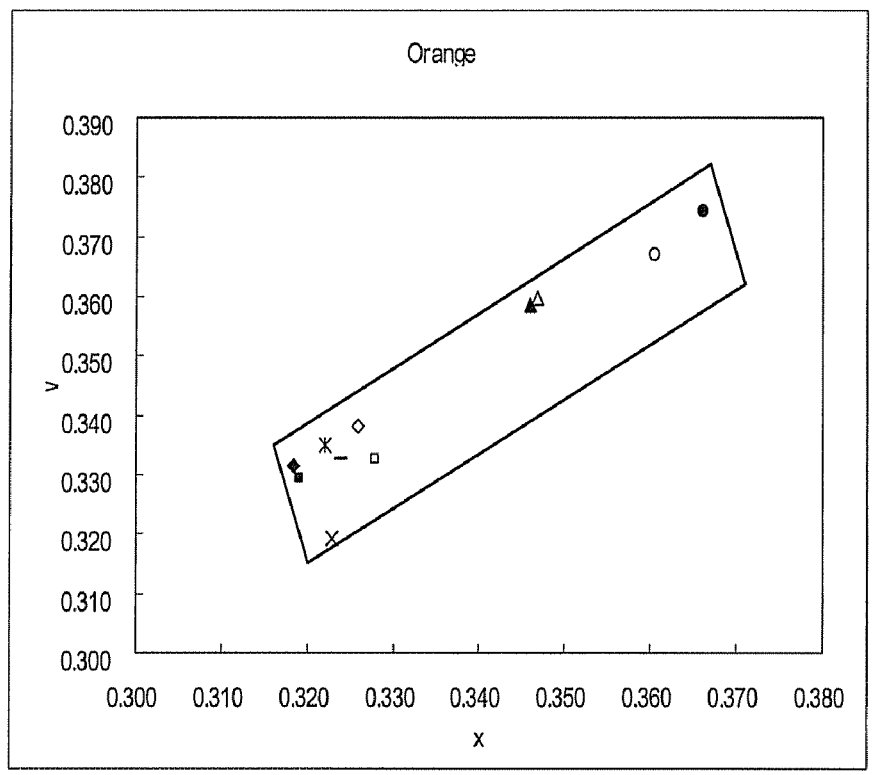
FIGS. 12A and 12B are a CIE chromaticity diagram of a lens base material and a CIE chromaticity diagram of an antireflection film according to Example 9, respectively.
Figure 12B:
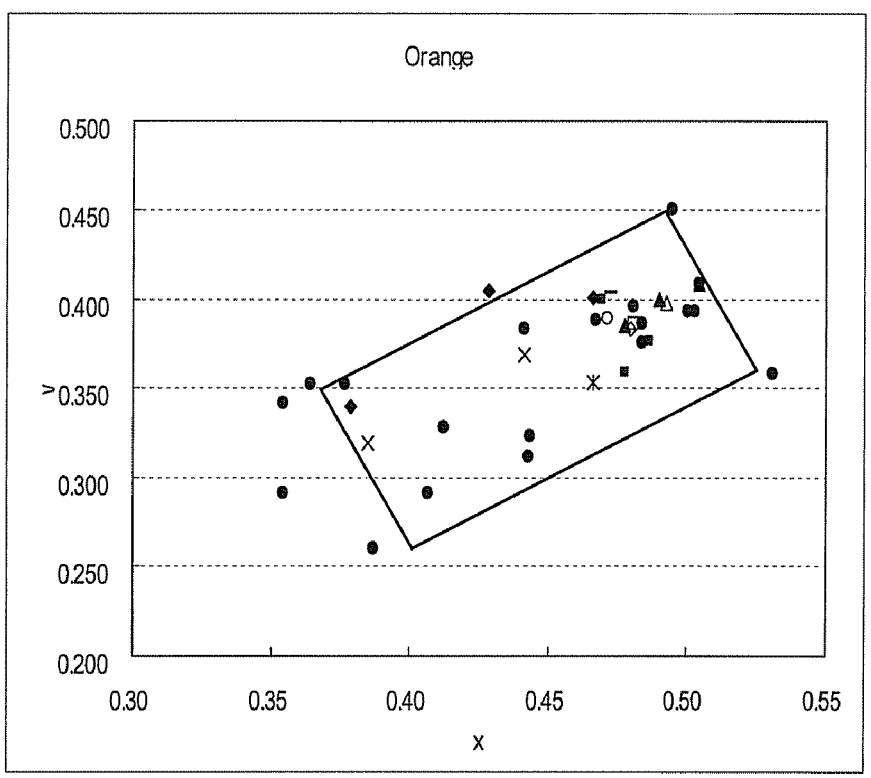

FIG. 12A is a diagram obtained by plotting respective chromaticity coordinates of transmitted light of the plural number of the Mars-yellow colored lens base materials 2 in the XYZ color system chromaticity diagram of the CIE color system; and FIG. 12B is a diagram obtained by plotting respective chromaticity coordinates of reflected light which the antireflection film 5 provided on the lens base material 2 presents in the subject chromaticity diagram. The chromaticity coordinates of reflected light by the antireflection film 5 provided on the lens base material 2 colored with a color according to the chromaticity coordinates of a plot shape "●" in FIG. 12A are shown by the same plot shape "●" in FIG. 11B; and the same is also applicable with respect to plot shapes "X", "▲", "■", "♦", "-", "*", "◇", "□", "○" and "△". In the present Example, the spectacle lenses 1 in the number of the plots in FIG. 12B are prepared (including those by computer simulation).

Then, as a result of mutual comparison of these spectacle lenses 1 by a color coordinator, an inventor and other means, it was noted that only the spectacle lenses 1 having the following chromaticity coordinates in FIG. 12B were Mars-yellow, however, the color was changed through the reflection and flicker occurs.

That is, as to "●", six points of (x, y)=(0.364, 0.353), (0.387, 0.260), (0.531, 0.358), (0.495, 0.451), (0.355, 0.29) and (0.355, 0.34) fall within it; and as to "♦", one point of (x, y)=(0.43, 0.405) falls within it.

In consequence, it is found that flicker can be prevented from occurring by making the range of the chromaticity coordinates of the antireflection film 5 fall within a range of a quadrilateral surrounded by a straight line group of the following equations (hereinafter referred to as "chromaticity range B2").

$$y=0.806x-0.063$$

$$y=0.806x+0.053$$

$$y=-2.727x+1.354$$

$$y=-2.727x+1.792$$

Further, to prevent a change of the external appearance color at the time of reflection with respect to the chromaticity range of the lens base material 2 corresponding to the foregoing chromaticity range of the antireflection film 5, the chromaticity range is defined to fall within a range of a quadrilateral surrounded by a straight line group of the following equations (hereinafter referred to as "chromaticity range B1"), not so far from the spectacle lens 1 according to the present Example. This is defined with consideration of the chromaticity coordinate values of other Mars-yellow colored spectacle lenses 1. In the subject chromaticity range B1, since the color is pale as a whole as compared with Examples 1 to 7 (especially Example 5), when the results of Examples 1 to 7 (especially Example 5) are also taken into consideration, it is noted that even by making it corresponding to the foregoing chromaticity range B2 of the antireflection film 5, it is possible to sufficiently prevent a flickering phenomenon of the external appearance from occurring.

$$y=0.922x+0.020$$

$$y=0.922x+0.044$$

$$y=-5.000x+1.915$$

$$y=-5.000x+2.217$$

It should be noted that even in the lens base material 2 colored corresponding to any one of the plots of FIG. 12A, the change of the color was not noticeable by providing the antireflection film 5 presenting the reflected color corresponding to the plot falling within the chromaticity range B2.

In this way, by coloring the lens base material 2 into a color according to the chromaticity coordinate value corresponding to any one of the points falling within the chromaticity range B1 and providing the antireflection film 5 presenting the reflected color according to the chromaticity coordinate value corresponding to any one of the points falling within the chromaticity range B2 on the lens base material 2, it is possible to provide a spectacle lens 1 according to Mars-yellow which is viewed such that the color of the transmitted light of the lens based material 2 according to Mars-yellow and the color of the reflected light of the antireflection film 5 agree with each other, which prevents a phenomenon that these colors are seen different from each other from occurring, is free from changes of the color against incident lights from various directions and has an external appearance with a consolidated feeling.

Example 10

Figure 13A:
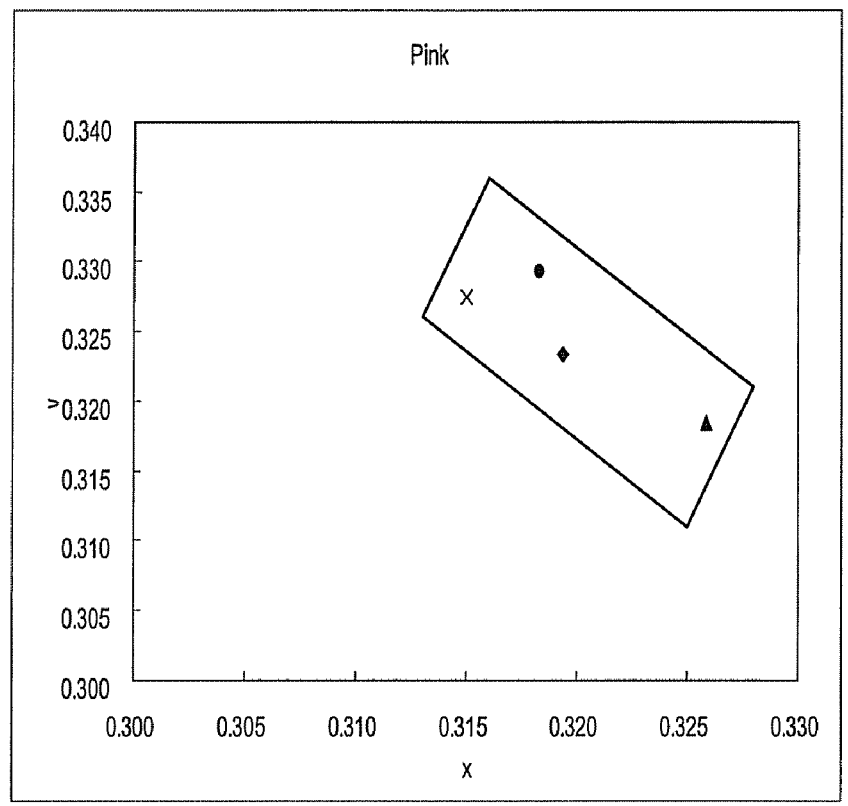
FIGS. 13A and 13B are a CIE chromaticity diagram of a lens base material and a CIE chromaticity diagram of an antireflection film according to Example 10, respectively.
Figure 13B:
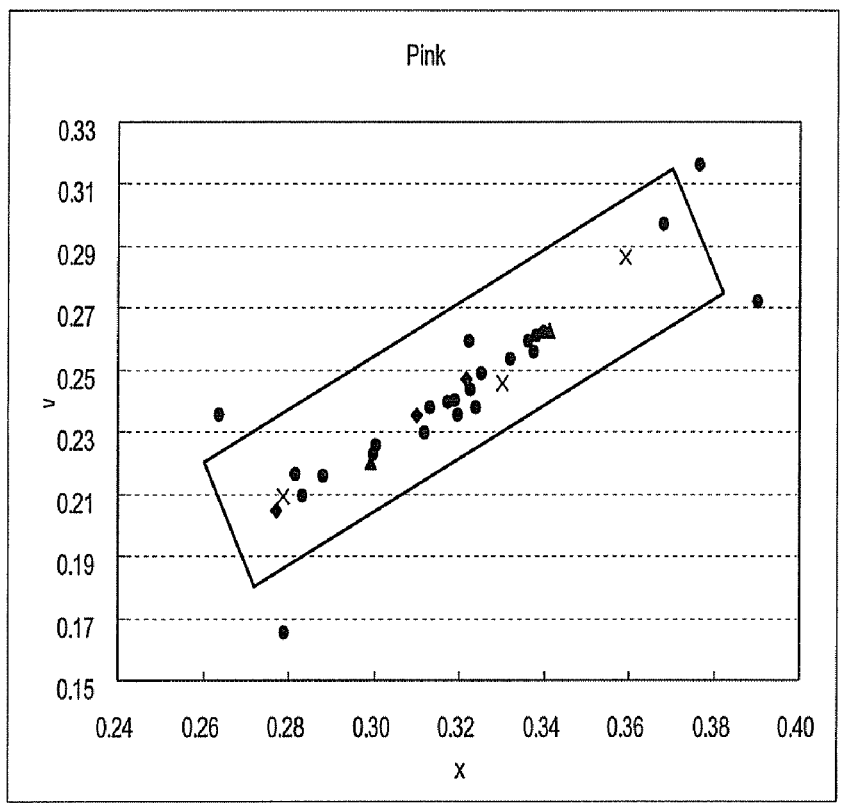

FIG. 13A is a diagram obtained by plotting respective chromaticity coordinates of transmitted light of the plural number of the pink colored lens base materials 2 in the XYZ color system chromaticity diagram of the CIE color system; and FIG. 13B is a diagram obtained by plotting respective chromaticity coordinates of reflected color which the antireflection film 5 formed on the lens base material 2 presents in the subject chromaticity diagram. The chromaticity coordinates of reflected light by the antireflection film 5 provided on the lens base material 2 colored with a color according to the chromaticity coordinates of a plot shape "●" in FIG. 13A are shown by the same plot shape "●" in FIG. 11B; and the same is also applicable with respect to plot shapes "X", "▲", "■" and "♦". In the present Example, the spectacle lenses 1 in the number of the plots in FIG. 13B are prepared (including those by computer simulation).

Then, as a result of mutual comparison of these spectacle lenses 1 by a color coordinator, an inventor and other means, it was noted that only the spectacle lenses 1 having the following chromaticity coordinates in FIG. 13B were pink, however, the color was changed through the reflection and flickered.

That is, as to "●", four points of (x, y)=(0.264, 0.236), (0.279, 0.165), (0.390, 0.272) and (0.377, 0.316) fall within it.

In consequence, it is found that flicker can be prevented from occurring by making the range of the chromaticity coordinates of the antireflection film 5 fall within a range of a quadrilateral surrounded by a straight line group of the following equations (hereinafter referred to as "chromaticity range C2").

$$y=0.864x-0.055$$

$$y=0.864x-0.005$$

$$y=-3.333x+1.087$$

$$y=-3.333x+1.548$$

Further, to prevent a change of the external appearance color at the time of reflection with respect to the chromaticity range of the lens base material 2 corresponding to the foregoing chromaticity range of the antireflection film 5, the chromaticity range is defined to fall within a range of a quadrilateral surrounded by a straight line group of the following equations (hereinafter referred to as "chromaticity range C1"), not so far from the spectacle lens 1 according to the present Example. This is defined with consideration of the chromaticity coordinate values of other pink colored spectacle lenses 1. In the subject chromaticity range C1, since the color is pale as a whole as compared with Examples 1 to 7 (especially Example 4), when the results of Examples 1 to 7 (especially Example 4) are also taken into consideration, it is noted that even by making it corresponding to the foregoing chromaticity range C2 of the antireflection film 5, it is possible to sufficiently prevent a flickering phenomenon of the external appearance from occurring.

$$y=-1.250x+0.717$$

$$y=-1.250x+0.731$$

$$y=3.333x-0.717$$

$$y=3.333x-0.772$$

Even in the lens base material 2 colored corresponding to any one of the plots of FIG. 13A, the change of the color was not noticeable, by providing the antireflection film 5 presenting the reflected color corresponding to the plot falling within the chromaticity range C2.

In this way, by coloring the lens base material 2 into a color according to the chromaticity coordinate value corresponding to any one of the points falling within the chromaticity range C1 and providing the antireflection film 5 presenting the reflected color according to the chromaticity coordinate value corresponding to any one of the points falling within the chromaticity range C2 on the lens base material 2, it is possible to provide a spectacle lens according to pink which is viewed such that the color of the transmitted light of the lens based material 2 according to pink and the color of the reflected light of the antireflection film 5 agree with each other, which prevents a phenomenon that these colors are seen different from each other from occurring, is free from changes of the color against incident lights from various directions and has an external appearance with a consolidated feeling.

Example 11

Figure 14A:
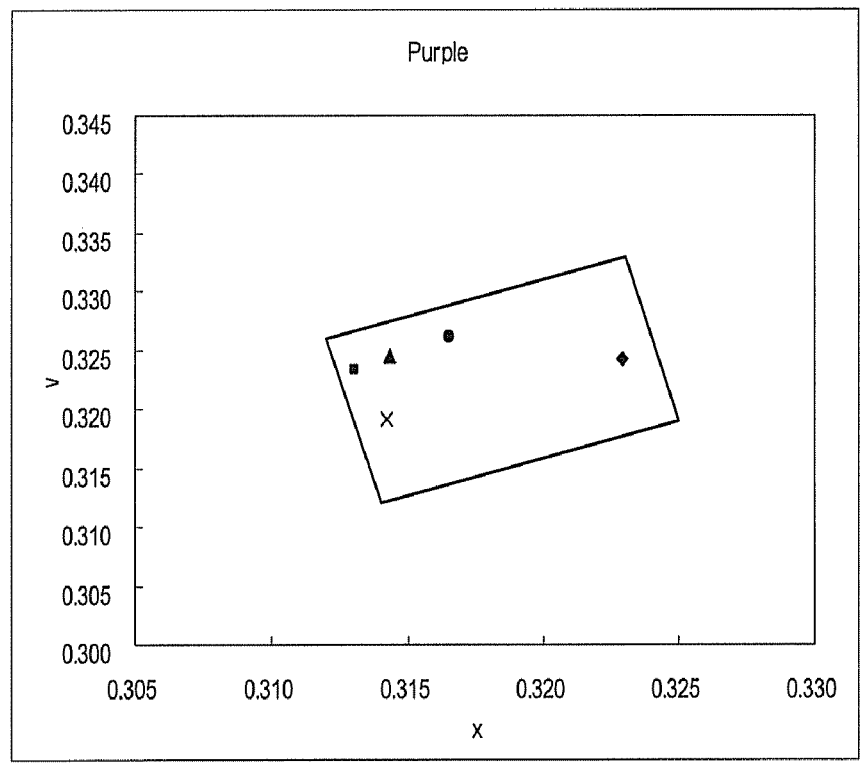
FIGS. 14A and 14B are a CIE chromaticity diagram of a lens base material and a CIE chromaticity diagram of an antireflection film according to Example 11, respectively.
Figure 14:
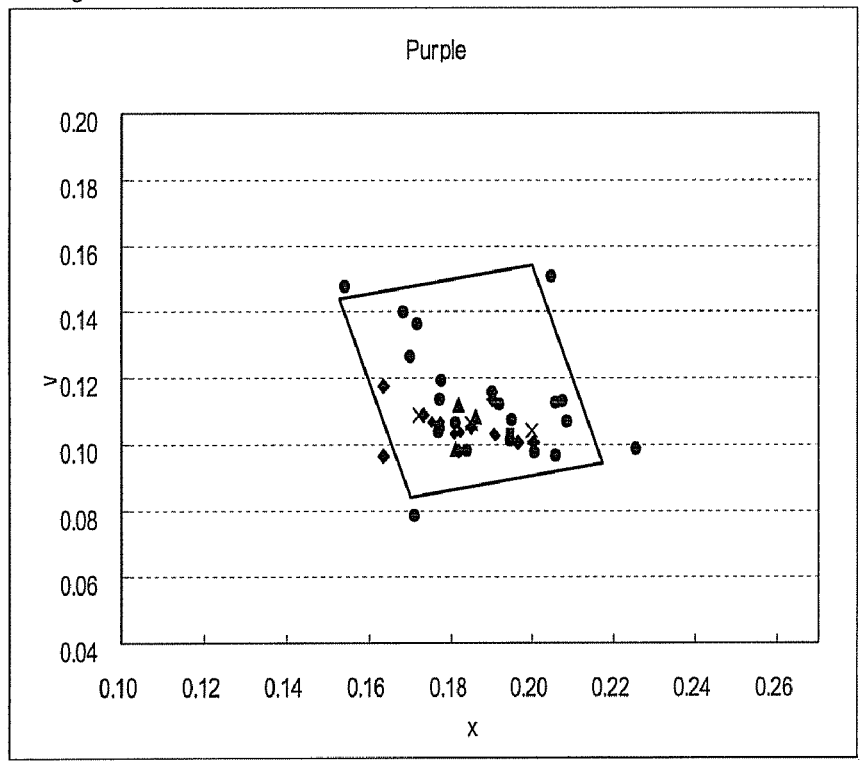

FIG. 14A is a diagram obtained by plotting respective chromaticity coordinates of transmitted light of the plural number of the purple colored lens base materials 2 in the XYZ color system chromaticity diagram of the CIE color system; and FIG. 14B is a diagram obtained by plotting respective chromaticity coordinates of reflected color which the antireflection film 5 provided on the lens base material 2 presents in the subject chromaticity diagram. The chromaticity coordinates of reflected light by the antireflection film 5 provided on the lens base material 2 colored with a color according to the chromaticity coordinates of a plot shape "●" in FIG. 14A are shown by the same plot shape "●" in FIG. 11B; and the same is also applicable with respect to plot shapes "X", "▲", "■" and "♦". In the present Example, the spectacle lenses 1 in the number of the plots in FIG. 14B are prepared (including those by computer simulation).

Then, as a result of mutual comparison of these spectacle lenses 1 by a color coordinator, an inventor and other-means, it was noted that only the spectacle lenses 1 having the following chromaticity coordinates in FIG. 14B were purple, however, the color was changed through the reflection and flicker occurs.

That is, as to "●", four points of (x, y)=(0.154, 0.147), (0.171, 0.078), (0.226, 0.098) and (0.205, 0.150) fall within it; and as to "♦", one point of (x, y)=(0.16, 0.095) falls within it.

In consequence, it is found that by making the range of the chromaticity coordinates of the antireflection film 5 fall within a range of a quadrilateral surrounded by a straight line group of the following equations (hereinafter referred to as "chromaticity range D2"), flicker can be prevented from occurring.

$$y=0.213x+0.048$$

$$y=0.213x+0.111$$

$$y=-3.529x+0.684$$

$$y=-3.529x+0.860$$

Further, to prevent a change of the external appearance color at the time of reflection with respect to the chromaticity range of the lens base material 2 corresponding to the foregoing chromaticity range of the antireflection film 5, the chromaticity range is defined to fall within a range of a quadrilateral surrounded by a straight line group of the following equations (hereinafter referred to as "chromaticity range D1"), not so far from the spectacle lens 1 according to the present Example. It is defined with consideration of the chromaticity coordinate values of other purple colored spectacle lenses 1. In the subject chromaticity range D1, since the color is pale as a whole as compared with Examples 1 to 7 (especially Example 3), when the results of Examples 1 to 7 (especially Example 3) are also taken into consideration, it is noted that even by making it corresponding to the foregoing chromaticity range D2 of the antireflection film 5, it is possible to sufficiently prevent a flickering phenomenon of the external appearance from occurring.

$$y=0.636x+0.112$$

$$y=0.636x+0.127$$

$$y=-7.000x+2.510$$

$$y=-7.000x+2.594$$

It should be noted that even in the lens base material 2 colored corresponding to any one of the plots of FIG. 14A, the change of the color was not noticeable by providing the antireflection film 5 presenting the reflected color corresponding to the plot falling within the chromaticity range D2.

In this way, by coloring the lens base material 2 into a color according to the chromaticity coordinate value corresponding to any one of the points falling within the chromaticity range D1 and forming the antireflection film 5 presenting the reflected color according to the chromaticity coordinate value corresponding to any one of the points falling within the chromaticity range D2 on the lens base material 2, it is possible to provide a spectacle lens 1 according to purple which is viewed such that the color of the transmitted light of the lens based material 2 according to purple and the color of the reflected light of the antireflection film 5 agree with each other, which prevents a phenomenon that these colors are seen different from each other from occurring, is free from a change of the color against incident lights from various directions and has an external appearance with a consolidated feeling.

Example 12

Figure 15A:
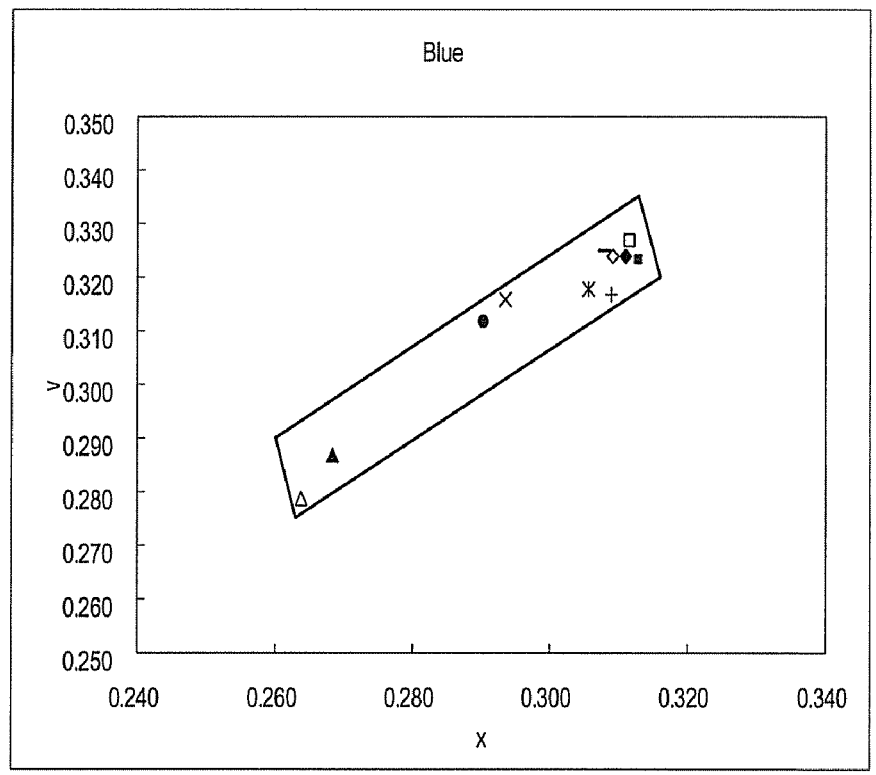
FIGS. 15A and 15B are a CIE chromaticity diagram of a lens base material and a CIE chromaticity diagram of an antireflection film according to Example 12, respectively.
Figure 15B:
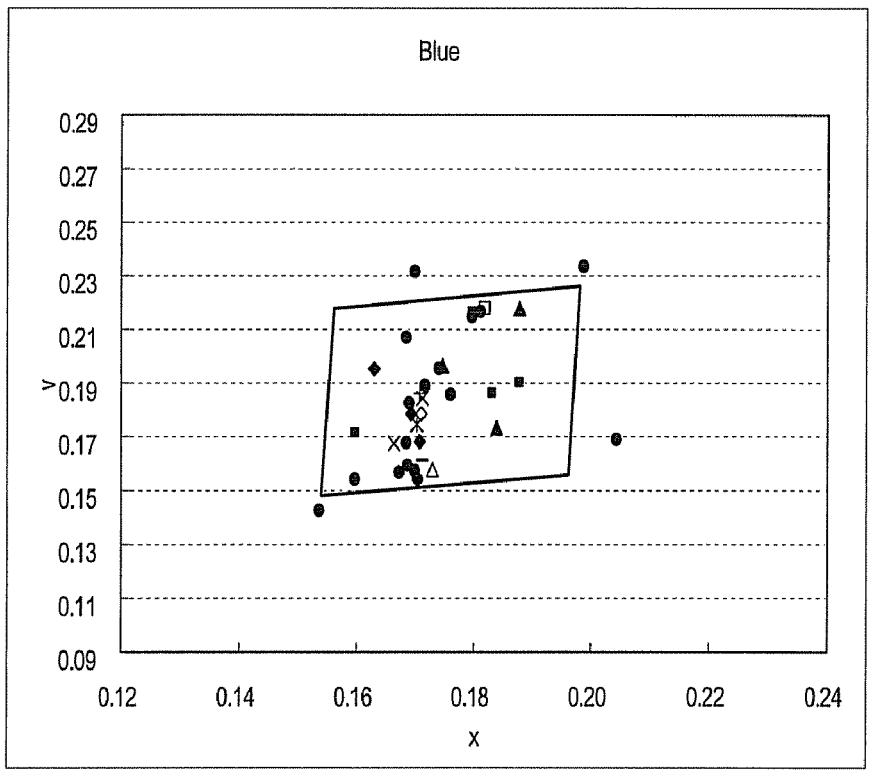

FIG. 15A is a diagram obtained by plotting respective chromaticity coordinates of transmitted light of the plural number of the blue colored lens base materials 2 in the XYZ color system chromaticity diagram of the CIE color system; and FIG. 15B is a diagram obtained by plotting respective chromaticity coordinates of reflected color which the antireflection film 5 provided on the lens base material 2 presents in the subject chromaticity diagram. The chromaticity coordinates of reflected light by the antireflection film 5 provided on the lens base material 2 colored with a color according to the chromaticity coordinates of a plot shape "●" in FIG. 15A are shown by the same plot shape "●" in FIG. 11B; and the same is also applicable with respect to plot shapes "X", "▲", "■", "-", "◆", "*", "◇", "□", "○", "◊" and "+". In the present Example, the spectacle lenses 1 in the number of the plots in FIG. 15B are prepared (including those by computer simulation).

Then, as a result of mutual comparison of these spectacle lenses 1 by a color coordinator, an inventor and other means, it was noted that only the spectacle lenses 1 having the following chromaticity coordinates in FIG. 15B were blue, however, the color was changed through the reflection and flickered.

That is, as to "●", four points of (x, y)=(0.170, 0.231), (0.154, 0.142), (0.204, 0.169) and (0.199, 0.233) fall within it.

In consequence, it is founded that flicker can be prevented from occurring by making the range of the chromaticity coordinates of the antireflection film 5 fall within a range of a quadrilateral surrounded by a straight line group of the following equations (hereinafter referred to as "chromaticity range E2").

$$y=0.190x+0.119$$

$$y=0.190x+0.188$$

$$y=35.000x-5.242$$

$$y=35.000x-6.704$$

Further, to prevent a change of the external appearance color at the time of reflection with respect to the chromaticity range of the lens base material 2 corresponding to the foregoing chromaticity range of the antireflection film 5, the chromaticity range is defined to fall within a range of a quadrilateral surrounded by a straight line group of the following equations (hereinafter referred to as "chromaticity range E1"), not so far from the spectacle lens 1 according to the present Example. It is defined with consideration of the chromaticity coordinate values of other blue colored spectacle lenses 1. In the subject chromaticity range E1, since the color is pale as a whole as compared with Examples 1 to 7 (especially Example 2), when the results of Examples 1 to 7 (especially Example 2) are also taken into consideration, it is noted that even by making it corresponding to the foregoing chromaticity range E2 of the antireflection film 5, it is possible to sufficiently prevent a flickering phenomenon of the external appearance from occurring.

$$y=0.849x+0.052$$

$$y=0.849x+0.069$$

$$y=-5.000x+1.590$$

$$y=-5.000x+1.900$$

It should be noted that even in the lens base material 2 colored corresponding to any one of the plots of FIG. 15A, the change of the color was not noticeable by providing the antireflection film 5 presenting the reflected color corresponding to the plot falling within the chromaticity range E2.

In this way, by coloring the lens base material 2 into a color according to the chromaticity coordinate value corresponding to any one of the points falling within the chromaticity range E1 and providing the antireflection film 5 presenting the reflected color according to the chromaticity coordinate value corresponding to any one of the points falling within the chromaticity range E2 on the lens base material 2, it is possible to provide a spectacle lens 1 according to blue which is viewed such that the color of the transmitted light of the lens based material 2 according to blue and the color of the reflected light of the antireflection film 5 agree with each other, which prevents a phenomenon that these colors are seen different from each other from occurring, is free from changes of the color against incident lights from various directions and has an external appearance with a consolidated feeling.

Example 13

Figure 16A:
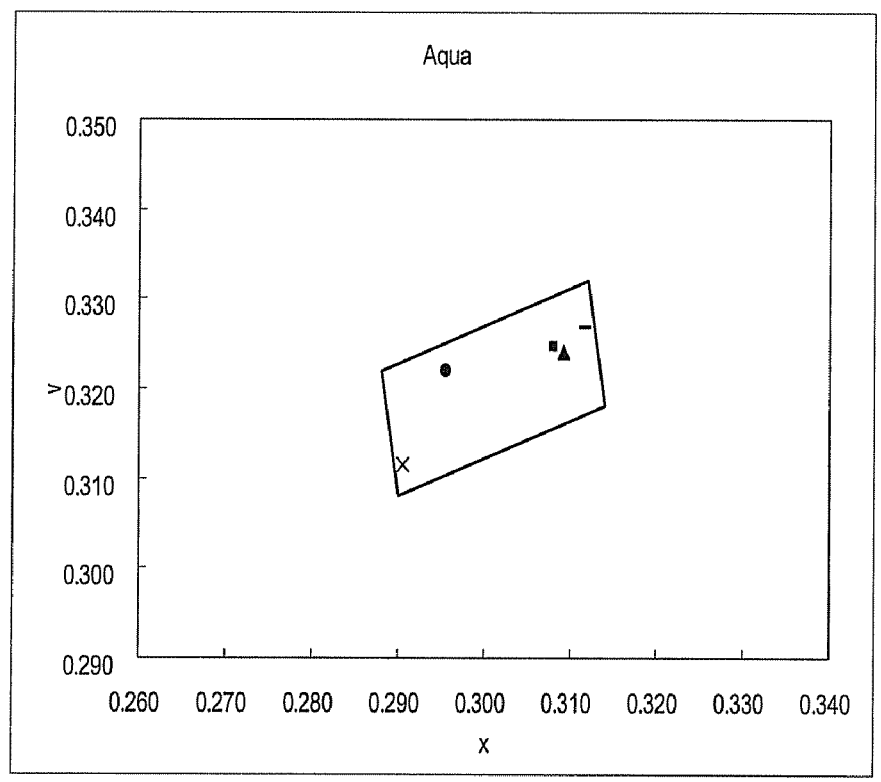
FIGS. 16A and 16B are a CIE chromaticity diagram of a lens base material and a CIE chromaticity diagram of an antireflection film according to Example 13, respectively.
Figure 16B:
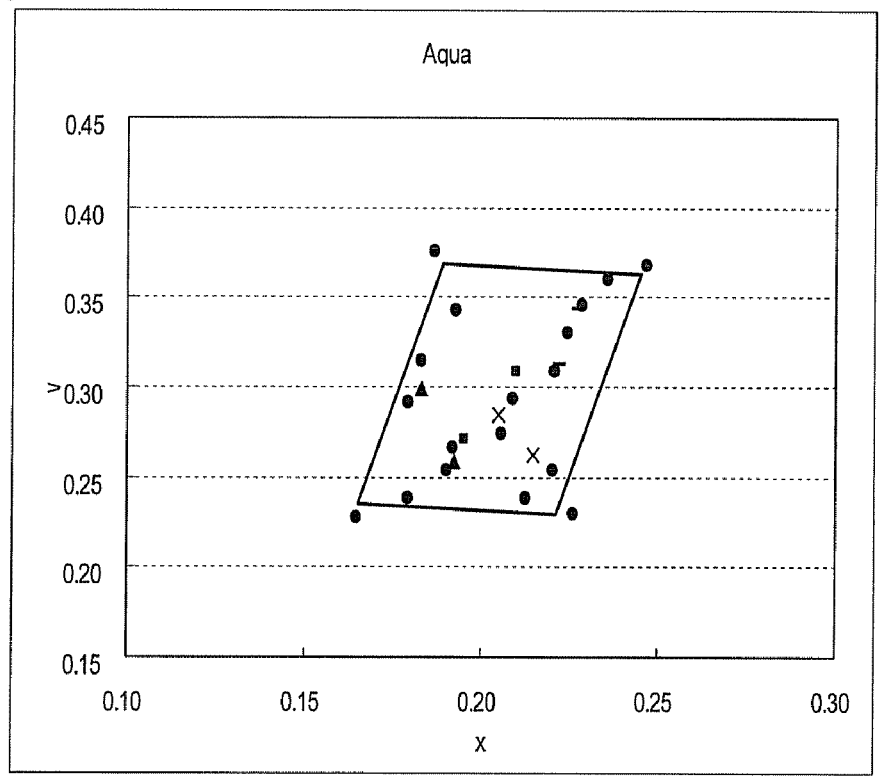

FIG. 16A is a diagram obtained by plotting respective chromaticity coordinates of transmitted light of the plural number of the aqua (light-blue) colored lens base materials 2 in the XYZ color system chromaticity diagram of the CIE color system; and FIG. 16B is a diagram obtained by plotting respective chromaticity coordinates of reflected color which the antireflection film 5 provided on the lens base material 2 presents in the subject chromaticity diagram. The chromaticity coordinates of reflected light by the antireflection film 5 provided on the lens base material 2 colored with a color according to the chromaticity coordinates of a plot shape "●" in FIG. 16A are shown by the same plot shape "●" in FIG. 11B; and the same is also applicable with respect to plot shapes "X", "▲", "■" and "-". In the present Example, the spectacle lenses 1 in the number of the plots in FIG. 16B are prepared (including those by computer simulation).

Then, as a result of mutual comparison of these spectacle lenses 1 by a color coordinator, an inventor and other means, it was noted that only the spectacle lenses 1 having the following chromaticity coordinates in FIG. 16B were light-blue, however, the color was changed through the reflection and flickered.

That is, as to "●", four points of (x, y)=(0.187, 0.376), (0.165, 0.227), (0.226, 0.230) and (0.247, 0.367) fall within it.

In consequence, it is found that flicker can be prevented from occurring by making the range of the chromaticity coordinates of the antireflection film 5 fall within a range of a quadrilateral surrounded by a straight line group of the following equations (hereinafter referred to as "chromaticity range F2").

$$y=-0.107x+0.253$$

$$y=-0.107x+0.389$$

$$y=5.583x-0.686$$

$$y=5.583x-1.005$$

Further, to prevent a change of the external appearance color at the time of reflection with respect to the chromaticity range of the lens base material 2 corresponding to the foregoing chromaticity range of the antireflection film 5, the chromaticity range is defined to fall within a range of a quadrilateral surrounded by a straight line group of the following equations (hereinafter referred to as "chromaticity range F1"), not so far from the spectacle lens 1 according to the present Example. This is defined with consideration of the chromaticity coordinate values of other light-blue colored spectacle lenses 1. In the subject chromaticity range F1, since the color is pale as a whole as compared with Examples 1 to 7 (especially Example 1), when the results of Examples 1 to 7 (especially Example 1) are also taken into consideration, it is noted that even by corresponding to the foregoing chromaticity range F2 of the antireflection film 5, it is possible to sufficiently prevent a flickering phenomenon of the external appearance from occurring.

$$y=0.417x+0.187$$

$$y=0.417x+0.202$$

$$y=-7.000x+2.338$$

$$y=-7.000x+2.516$$

It should be noted that even in the lens base material 2 colored corresponding to any one of the plots of FIG. 16A, the change of the color was not noticeable by providing the antireflection film 5 presenting the reflected color corresponding to the plot falling within the chromaticity range F2.

In this way, by coloring the lens base material 2 into a color according to the chromaticity coordinate value corresponding to any one of the points falling within the chromaticity range F1 and providing the antireflection film 5 presenting the reflected color according to the chromaticity coordinate value corresponding to any one of the points falling within the chromaticity range F2 on the lens base material 2, it is possible to provide a spectacle lens 1 according to aqua (light-blue) which is viewed such that the color of the transmitted light of the lens based material 2 according to light-blue and the color of the reflected light of the antireflection film 5 agree with each other, which prevents a phenomenon that these colors are seen different from each other from occurring, is free from changes of the color against incident lights from various directions and has an external appearance with a consolidated feeling.

<Examples of Spectacle>

By edging the thus obtained respective spectacle lenses 1 and putting them on a frame, it is possible to obtain a spectacle which presents a reflected color equal to the coloration of the lens base material 2; even when a person other than a spectacle wearing person views reflected light, the color is not changed as compared with that before viewing; and has the novel beauty with a consolidated feeling.

Needless to say, the spectacle lens includes not only prescription lenses but non-prescription lenses for sunglass, protection spectacle or the like, or includes prescription lenses for sunglass or description lenses for protection spectacle or the like; and the spectacle includes prescription or non-prescription sunglasses or protection spectacles or the like.

DESCRIPTION OF REFERENCE NUMERALS AND SIGNS

1: Spectacle lens
2: Lens base material
3: Inner surface
4: Outer surface
5: Antireflection film

The invention claimed is:

1. A spectacle lens, which is characterized in that a lens base material is colored with a color within a range of a quadrilateral surrounded by a straight line group of the following equations on an XYZ color system chromaticity diagram of the CIE color system:

$$y=1.151x-0.012$$

$$y=1.151x+0.007$$

$$y=-2.800x+1.181$$

$$y=-2.800x+1.548$$

and that reflected light by an antireflection film presents a color within a range of a quadrilateral surrounded by a straight line group of the following equations on the XYZ color system chromaticity diagram:

$$y=0.720x+0.095$$

$$y=0.720x+0.164$$

$$y=-2.750x+1.205$$

$$y=-2.750x+1.639.$$

2. A spectacle having the spectacle lens according to claim 1.

3. A spectacle lens, which is characterized in that a lens base material is colored with a color within a range of a quadrilateral surrounded by a straight line group of the following equations on an XYZ color system chromaticity diagram of the CIE color system:

$$y=0.922x+0.020$$

$$y=0.922x+0.044$$

$$y=-5.000x+1.915$$

$$y=-5.000x+2.217$$

and that reflected light by an antireflection film presenting a color within a range of a quadrilateral surrounded by a straight line group of the following equations on the XYZ color system chromaticity diagram:

$$y=0.806x-0.063$$

$$y=0.806x+0.053$$

$$y=-2.727x+1.354$$

$$y=-2.727x+1.792.$$

4. A spectacle having the spectacle lens according to claim 3.

5. A spectacle lens, which is characterized in that a lens base material is colored with a color within a range of a quadrilateral surrounded by a straight line group of the following equations on an XYZ color system chromaticity diagram of the CIE color system:

$$y=-1.250x+0.717$$

$$y=-1.250x+0.731$$

$$y=3.333x-0.717$$

$$y=3.333x-0.772$$

and
that reflected light by an antireflection film presents a color within a range of a quadrilateral surrounded by a straight line group of the following equations on the XYZ color system chromaticity diagram:

$$y=0.864x-0.055$$

$$y=0.864x-0.005$$

$$y=-3.333x+1.087$$

$$y=-3.333x+1.548.$$

6. A spectacle having the spectacle lens according to claim 5.

7. A spectacle lens, which is characterized in that a lens base material is colored with a color within a range of a quadrilateral surrounded by a straight line group of the following equations on an XYZ color system chromaticity diagram of the CIE color system:

$$y=0.636x+0.112$$

$$y=0.636x+0.127$$

$$y=-7.000x+2.510$$

$$y=-7.000x+2.594$$

and
that reflected light by an antireflection film presents a color belonging within a range of a quadrilateral surrounded by a straight line group of the following equations on the XYZ color system chromaticity diagram:

$$y=0.213x+0.048$$

$$y=0.213x+0.111$$

$$y=-3.529x+0.684$$

$$y=-3.529x+0.860.$$

8. A spectacle having the spectacle lens according to claim 7.

9. A spectacle lens, which is characterized in that a lens base material is colored with a color within a range of a quadrilateral surrounded by a straight line group of the following equations on an XYZ color system chromaticity diagram of the CIE color system:

$$y=0.849x+0.052$$

$$y=0.849x+0.069$$

$$y=-5.000x+1.590$$

$$y=-5.000x+1.900$$

and
that reflected light by an antireflection film presents a color within a range of a quadrilateral surrounded by a straight line group of the following equations on the XYZ color system chromaticity diagram:

$$y=0.190x+0.119$$

$$y=0.190x+0.188$$

$$y=35.000x-5.242$$

$$y=35.000x-6.704.$$

10. A spectacle having the spectacle lens according to claim 9.

11. A spectacle lens, which is characterized in that a lens base material is colored with a color within a range of a quadrilateral surrounded by a straight line group of the following equations on an XYZ color system chromaticity diagram of the CIE color system:

$$y=0.417x+0.187$$

$$y=0.417x+0.202$$

$$y=-7.000x+2.338$$

$$y=-7.000x+2.516$$

and
that reflected light by an antireflection film presents a color within a range of a quadrilateral surrounded by a straight line group of the following equations on the XYZ color system chromaticity diagram:

$$y=-0.107x+0.253$$

$$y=-0.107x+0.389$$

$$y=5.583x-0.686$$

$$y=5.583x-1.005.$$

12. A spectacle having the spectacle lens according to claim 11.

* * * * *